US009814985B2

(12) United States Patent
Levi et al.

(10) Patent No.: US 9,814,985 B2
(45) Date of Patent: Nov. 14, 2017

(54) SYSTEM AND METHOD FOR ADVERTISING DISTRIBUTION THROUGH MOBILE SOCIAL GAMING

(71) Applicant: Blue Calypso, LLC, Richardson, TX (US)

(72) Inventors: Andrew E. Levi, Dallas, TX (US); Jean Pierre Dela Valdene, Dallas, TX (US); William Rushing, Carrollton, TX (US); Bradley W. Bauer, Richardson, TX (US)

(73) Assignee: Blue Calypso, LLC, Richardson, TX (US)

( * ) Notice: Subject to any disclaimer, the term of this patent is extended or adjusted under 35 U.S.C. 154(b) by 95 days.

(21) Appl. No.: 15/132,175

(22) Filed: Apr. 18, 2016

(65) Prior Publication Data
US 2016/0228774 A1 Aug. 11, 2016

Related U.S. Application Data

(63) Continuation-in-part of application No. 14/042,319, filed on Sep. 30, 2013, now Pat. No. 9,314,697.
(Continued)

(51) Int. Cl.
*A63F 13/30* (2014.01)
*A63F 13/795* (2014.01)
(Continued)

(52) U.S. Cl.
CPC .......... *A63F 13/795* (2014.09); *A63F 13/216* (2014.09); *A63F 13/30* (2014.09);
(Continued)

(58) Field of Classification Search
CPC ...... A63F 13/795; A63F 13/216; A63F 13/30; A63F 13/61; A63F 13/85; A63F 13/35; A63F 2300/51
(Continued)

(56) References Cited

U.S. PATENT DOCUMENTS

| 4,850,007 A | 7/1989 | Marino et al. |
| 5,333,186 A | 7/1994 | Gupta |

(Continued)

FOREIGN PATENT DOCUMENTS

| GB | 2504952 | 2/2014 |
| JP | 2001256388 A | 9/2001 |

(Continued)

OTHER PUBLICATIONS

Akriga, LiveScratch Wildfire Viral Campaigns with in-built Forwarding Motivation, www.akriga.com, Feb. 22, 2005.
(Continued)

*Primary Examiner* — Allen Chan
(74) *Attorney, Agent, or Firm* — Schultz & Associates, P.C.

(57) ABSTRACT

A system and method is disclosed for advertising through a social network by immersion of participants in a sponsored mobile game. A game application for the sponsored game is developed on a server and deployed on consumer devices connected to the server. The game application, operating on a smart phone, utilizes onboard GPS and camera subsystems to carry out and facilitate the game functions. A dashboard is provided for designing the game around an advertising campaign. The game application is syndicated and shared through a consumer's social media community. The game is tracked by the server. Game information and rewards are delivered to participants during and after the game. In one aspect, the game involves a participant gathering digital permits prior to and during the game which are used to complete a tagging event with other participants. Rewards such as redeemable coupons are based on actions at sponsor locations.

18 Claims, 21 Drawing Sheets

Related U.S. Application Data

(60) Provisional application No. 61/859,107, filed on Jul. 26, 2013.

(51) Int. Cl.
- *A63F 13/85* (2014.01)
- *A63F 13/216* (2014.01)
- *A63F 13/61* (2014.01)
- *A63F 13/35* (2014.01)

(52) U.S. Cl.
CPC .............. *A63F 13/61* (2014.09); *A63F 13/85* (2014.09); *A63F 13/35* (2014.09); *A63F 2300/51* (2013.01)

(58) Field of Classification Search
USPC .......................................................... 463/31
See application file for complete search history.

(56) References Cited

U.S. PATENT DOCUMENTS

| | | |
|---|---|---|
| 5,448,625 A | 9/1995 | Lederman |
| 5,852,775 A | 12/1998 | Hidary |
| 5,873,068 A | 2/1999 | Beaumont et al. |
| 5,933,811 A | 8/1999 | Angles et al. |
| 5,937,037 A | 8/1999 | Kamel et al. |
| 5,999,914 A | 12/1999 | Blinn et al. |
| 6,009,150 A | 12/1999 | Kamel |
| 6,029,141 A | 2/2000 | Bezos et al. |
| 6,032,130 A | 2/2000 | Alloul et al. |
| 6,084,628 A | 7/2000 | Sawyer |
| 6,101,484 A | 8/2000 | Halbert |
| 6,181,927 B1 | 1/2001 | Welling, Jr. et al. |
| 6,269,343 B1 | 7/2001 | Pallakoff |
| 6,351,279 B1 | 2/2002 | Sawyer |
| 6,442,529 B1 | 8/2002 | Krishan et al. |
| 6,493,437 B1 | 12/2002 | Olshanksy |
| 6,519,571 B1 | 2/2003 | Guheen et al. |
| 6,604,089 B1 | 8/2003 | Van Horn et al. |
| 6,631,356 B1 | 10/2003 | Van Horn |
| 6,691,032 B1 | 2/2004 | Irish et al. |
| 6,862,575 B1 | 3/2005 | Anttila et al. |
| 6,985,879 B2 | 1/2006 | Walker et al. |
| 6,996,579 B2 | 2/2006 | Leung |
| 7,039,599 B2 | 5/2006 | Merriman et al. |
| 7,085,682 B1 | 8/2006 | Heller et al. |
| 7,107,230 B1 | 9/2006 | Halbert |
| 7,120,592 B1 | 10/2006 | Lewis |
| 7,124,099 B2 | 10/2006 | Mesaros |
| 7,124,107 B1 | 10/2006 | Pishevar et al. |
| 7,146,330 B1 | 12/2006 | Alon |
| 7,181,419 B1 | 2/2007 | Mesaros |
| 7,184,972 B2 | 2/2007 | Flaherty |
| 7,194,427 B1 | 3/2007 | Van Horn |
| 7,197,544 B2 | 3/2007 | Wang et al. |
| 7,240,843 B2 | 7/2007 | Paul et al. |
| 7,243,082 B1 | 7/2007 | Forlai |
| 7,249,056 B1 | 7/2007 | Crouthamel et al. |
| 7,263,498 B1 | 8/2007 | Van Horn |
| 7,272,575 B2 | 9/2007 | Vega |
| 7,319,881 B2 | 1/2008 | Endo |
| 7,338,911 B2 | 3/2008 | Kido |
| 7,349,827 B1 | 3/2008 | Heller et al. |
| 7,400,711 B1 | 7/2008 | Ford et al. |
| 7,463,898 B2 | 12/2008 | Bayne |
| 7,467,103 B1 | 12/2008 | Murray et al. |
| 7,480,627 B1 | 1/2009 | Van Horn |
| 7,536,324 B2 | 5/2009 | Perkowski |
| 7,555,466 B2 | 6/2009 | Eglen |
| 7,593,871 B1 | 9/2009 | Mesaros |
| 7,599,852 B2 | 10/2009 | Bosarge et al. |
| 7,599,858 B1 | 10/2009 | Grady |
| 7,650,431 B2 | 1/2010 | Wang et al. |
| 7,664,726 B2 | 2/2010 | Jain et al. |
| 7,672,897 B2 | 3/2010 | Chung |
| 7,751,548 B1 | 7/2010 | Mashinsky et al. |
| 7,844,488 B2 | 11/2010 | Merriman et al. |
| 7,917,402 B2 | 3/2011 | Rolf et al. |
| 8,069,169 B2 | 11/2011 | Fitzpatrick et al. |
| 8,117,464 B1 | 2/2012 | Kogelnik |
| 8,292,741 B2 | 10/2012 | Burman et al. |
| 8,407,084 B2 | 3/2013 | Chuch |
| 8,419,535 B2 | 4/2013 | Miller et al. |
| 8,423,892 B1 | 4/2013 | Marsland et al. |
| 8,433,611 B2 | 4/2013 | Lax et al. |
| 8,460,107 B2 | 6/2013 | Barclay et al. |
| 8,485,878 B2 | 7/2013 | Aaron et al. |
| 8,491,395 B2 | 7/2013 | Auterio et al. |
| 8,506,409 B2 | 8/2013 | Bethke et al. |
| 8,515,825 B1 | 8/2013 | Ross et al. |
| 8,533,039 B1 | 9/2013 | Winslade et al. |
| 8,560,537 B2 | 10/2013 | Ramer et al. |
| 8,573,491 B2 | 11/2013 | Bennett et al. |
| 8,671,012 B2 † | 3/2014 | Gross |
| 2001/0029464 A1 | 10/2001 | Schweitzwer |
| 2001/0044745 A1 | 11/2001 | Shaw |
| 2001/0047294 A1 | 11/2001 | Rothschild |
| 2002/0052925 A1 | 5/2002 | Kim et al. |
| 2002/0065713 A1 | 5/2002 | Awada et al. |
| 2002/0071076 A1 | 6/2002 | Webb |
| 2002/0072967 A1 | 6/2002 | Jacobs et al. |
| 2002/0077988 A1 | 6/2002 | Sasaki et al. |
| 2002/0090985 A1 | 7/2002 | Tochner et al. |
| 2002/0091569 A1 | 7/2002 | Kitaura |
| 2002/0094868 A1 | 7/2002 | Tuck et al. |
| 2002/0103647 A1 | 8/2002 | Houplain |
| 2002/0111201 A1 | 8/2002 | Lang |
| 2002/0160761 A1 | 10/2002 | Wolfe |
| 2002/0169835 A1 | 11/2002 | Paul, Jr. et al. |
| 2002/0198777 A1 | 12/2002 | Yuasa |
| 2003/0004802 A1 | 1/2003 | Callegari |
| 2003/0032409 A1 | 2/2003 | Hutcheson et al. |
| 2003/0069785 A1 | 4/2003 | Lohse |
| 2003/0096662 A1 | 5/2003 | Iwami |
| 2003/0144035 A1 | 7/2003 | Weinblatt |
| 2003/0158776 A1 | 8/2003 | Landesmann |
| 2003/0172376 A1 | 9/2003 | Coffin, III |
| 2003/0177347 A1 | 9/2003 | Schneier |
| 2003/0233276 A1 | 12/2003 | Pearlman |
| 2004/0048604 A1 | 3/2004 | Idei |
| 2004/0068440 A1 | 4/2004 | Porato |
| 2004/0103023 A1 | 5/2004 | Irwin |
| 2004/0148424 A1 | 7/2004 | Berkson et al. |
| 2004/0177003 A1 | 9/2004 | Liao |
| 2004/0220851 A1 | 11/2004 | Silver et al. |
| 2005/0044483 A1 | 2/2005 | Maze et al. |
| 2005/0055409 A1 | 3/2005 | Alsarraf et al. |
| 2005/0096982 A1 | 5/2005 | Morton et al. |
| 2005/0130685 A1 | 6/2005 | Jenkin |
| 2005/0131761 A1 | 6/2005 | Trika et al. |
| 2005/0165640 A1 | 7/2005 | Kotorov |
| 2005/0192000 A1 | 9/2005 | Lloyd |
| 2005/0273351 A1 | 12/2005 | Chudnovsky |
| 2006/0004713 A1 | 1/2006 | Korte et al. |
| 2006/0041469 A1 | 2/2006 | Mathis |
| 2006/0041477 A1 | 2/2006 | Zheng |
| 2006/0080111 A1 | 4/2006 | Homeier-Beals |
| 2006/0111967 A1 | 5/2006 | Forbes |
| 2007/0033133 A1 | 2/2007 | Pishevar |
| 2007/0043651 A1 | 2/2007 | Xiao et al. |
| 2007/0073593 A1 | 3/2007 | Perry et al. |
| 2007/0121843 A1 | 5/2007 | Atazky et al. |
| 2007/0140176 A1 | 6/2007 | Bachenberg |
| 2007/0173236 A1 | 6/2007 | Vishwanathan et al. |
| 2007/0192182 A1 | 8/2007 | Monaco |
| 2007/0203792 A1 | 8/2007 | Rao |
| 2007/0207780 A1 | 9/2007 | McLean |
| 2007/0241189 A1 | 10/2007 | Slavin |
| 2007/0244750 A1 | 10/2007 | Grannan et al. |
| 2007/0265915 A1 | 11/2007 | Gould et al. |
| 2007/0271139 A1 | 11/2007 | Fiorini |
| 2007/0281692 A1 | 12/2007 | Bucher |
| 2007/0290031 A1 | 12/2007 | Singh |
| 2008/0052169 A1 | 2/2008 | O'Shea et al. |

(56) References Cited

U.S. PATENT DOCUMENTS

| | | |
|---|---|---|
| 2008/0119168 A1 | 5/2008 | Farkas et al. |
| 2008/0126240 A1 | 5/2008 | Banbury |
| 2008/0133366 A1 | 6/2008 | Evans |
| 2008/0133678 A1 | 6/2008 | Woodham et al. |
| 2008/0167102 A1 | 7/2008 | Diakopoulos |
| 2008/0172285 A1 | 7/2008 | Hurowitz |
| 2008/0183587 A1 | 7/2008 | Joo et al. |
| 2008/0235093 A1 | 9/2008 | Uland |
| 2008/0255966 A1 | 10/2008 | Kopelman |
| 2008/0256233 A1 | 10/2008 | Hall et al. |
| 2008/0263584 A1 | 10/2008 | Salo et al. |
| 2008/0270363 A1 | 10/2008 | Hunt et al. |
| 2008/0287150 A1 | 11/2008 | Jiang et al. |
| 2009/0005140 A1 | 1/2009 | Rose et al. |
| 2009/0017913 A1 | 1/2009 | Bell et al. |
| 2009/0030774 A1 | 1/2009 | Rothschild et al. |
| 2009/0099929 A1 | 4/2009 | Thibedeau |
| 2009/0106368 A1 | 4/2009 | Padveen et al. |
| 2009/0198622 A1 | 8/2009 | Temte |
| 2009/0204901 A1 | 8/2009 | Dharmaji et al. |
| 2009/0240629 A1 | 9/2009 | Xie et al. |
| 2009/0287555 A1 | 11/2009 | Faraee |
| 2009/0287574 A1 | 11/2009 | Kane |
| 2009/0307145 A1 | 12/2009 | Mesaros |
| 2010/0016080 A1 | 1/2010 | Garden et al. |
| 2010/0124991 A1 | 5/2010 | O'Sullivan et al. |
| 2010/0125490 A1 | 5/2010 | Kiciman et al. |
| 2010/0287011 A1 | 11/2010 | Muchkaev |
| 2010/0318418 A1 | 12/2010 | Wertheimer et al. |
| 2011/0039623 A1 | 2/2011 | Levenson |
| 2011/0093318 A1 | 4/2011 | Guday et al. |
| 2011/0288917 A1 | 11/2011 | Wanek et al. |
| 2012/0047017 A1 | 2/2012 | Hernandez et al. |
| 2012/0078696 A1 | 3/2012 | Roark |
| 2012/0142429 A1 | 6/2012 | Muller |
| 2012/0197724 A1 | 8/2012 | Kendall |
| 2012/0239483 A1 | 9/2012 | Yankovich et al. |
| 2012/0323689 A1 | 12/2012 | Metcalf et al. |
| 2013/0054366 A1 | 2/2013 | Roundtree et al. |
| 2013/0060634 A1 | 3/2013 | Corson |
| 2013/0246199 A1 | 9/2013 | Carlson |
| 2013/0290101 A1 | 10/2013 | Arini et al. |

FOREIGN PATENT DOCUMENTS

| | | |
|---|---|---|
| JP | 2006113888 | 4/2006 |
| JP | 2007219840 A | 8/2007 |
| KR | 2006028602 A | 3/2006 |
| WO | 1996024213 A1 | 8/1996 |
| WO | 9946709 | 9/1999 |
| WO | 2000041121 A1 | 7/2000 |
| WO | 0070585 | 11/2000 |
| WO | 2001011472 | 2/2001 |
| WO | 2001016853 A1 | 3/2001 |
| WO | 2004077319 | 9/2004 |
| WO | 2007139348 A1 | 12/2007 |
| WO | 2008141425 | 11/2008 |
| WO | 2009148338 A2 | 12/2009 |
| WO | 2013006147 | 1/2013 |

OTHER PUBLICATIONS

Almeroth, Kevin, et al. "Coupons: Wide Scale Information Distribution for Wireless Ad Hoc Networks", undated.

Avancha, Sasikanth, et al., P2P M-commerce in Pervasive Environments, ACM SIGecom Exchanges, 2003, pp. 1-9, vol. 3, No. 4.

Callegari, Jeff, NeuMobility and MapInfo Delivering Mobile Commerce Platform, MapInfo Magazine, Spring 2001, pp. 6-9, vol. 6, No. 2.

Castella-Roca, Jordi, et al. "An Incentive-Based System for Information Providers Over Peer-to-Peer Mobile Ad-Hoc Networks", MDAI 2007, LNAI 4617, pp. 380-392, 2007.

Cattelan, Renan G, et al., Prototyping a Novel Platform for the Free-Trade of Digital Content, [undated], pp. 79-88, WebMedia '06 Proceedings of the 12th Brazilian Symposium on Multimedia and the Web.

Chakraborty, Dipanjan, et al., Dreggie: Semantic Service Discovery for M-commerce Applications, Workshop on Reliable and Secure Applications in Mobile Environment, 20th Symposium on Reliable Distributed Systems, [undated], pp. 28-31.

Chande, Suresh, "Viral Distribution Potential Based Active Node Identification for Ad Distribution in Viral Networks", International Journal of Mobile Marketing, vol. 4 No. 1, Jun. 2009.

Chen, Xiaoyan, et al., "An Efficient Spatial Publish/Subscribe System for Intelligent Location-Based Services," DEBS03, 2003, San Diego, USA.

Cost, R. Scott, et al., ITtalks: A Case Study in the Semantic Web and DAML Oil, Intelligent Systems, IEEE, 2002, pp. 40-47, vol. 17, No. 1.

Gao, J Kulkarni, V Ranavat, H Lee Chang Hsing Mei; A 2D Barcode-Based Mobile Payment System; Multimedia and Ubiquitous Engineering, 2009. MUE '09; Jun. 4-6, 2009; pp. 320-329.

Gao, Jagatesan; Understanding 2D-BarCode Tech and Appls in M-Commerce-Design and Implementation of a 2D Barcode Processing Solution; COMPSAC 2007; Jul. 24-27, 2007; pp. 49-56.

Groupon, Inc. v. Blue Calypso, LLC; Case No. CBM2013-00033; Paper 10; Dec. 19, 2013.

Groupon, Inc. v. Blue Calypso, LLC; Case No. CBM2013-00034; Final Written Decision; Paper 45; Dec. 17, 2014.

Groupon, Inc. v. Blue Calypso, LLC; Case No. CBM2013-00034; Paper 9; Dec. 19, 2013.

Groupon, Inc. v. Blue Calypso, LLC; Case No. CBM2013-00035; Final Written Decision; Paper 45; Dec. 17, 2014.

Groupon, Inc. v. Blue Calypso, LLC; Case No. CBM2013-00035; Paper 11; Dec. 19, 2013.

Groupon, Inc. v. Blue Calypso, LLC; Case No. CBM2013-00044; Final Written Decision; Paper 47; Dec. 17, 2014.

Groupon, Inc. v. Blue Calypso, LLC; Case No. CBM2013-00044; Paper 9; Jan. 17, 2014.

Groupon, Inc. v. Blue Calypso, LLC; Case No. CBM2013-00046; Final Written Decision; Paper 46; Dec. 17, 2014.

Groupon, Inc. v. Blue Calypso, LLC; Case No. CBM2013-00046; Paper 9; Jan. 17, 2014.

Groupon, Inc. v. Blue Calypso, LLC; PTAB Case No. CBM2013-00033; Final Written Decision; Paper 51; Dec. 17, 2014.

Kato, H. Tan, K.T.; 2D barcodes for mobile phones; Mobile Technology, Applications and Systems, 2005 2nd International Conference on; Nov. 15-17, 2005; p. 8.

Kauffman, R. and Wang, B., Bid Together, Buy Together: On the Efficacy of Group-Buying Business Models in Internet-Based Selling. "The Revolution Goes Mobile", 5th Annual University of Minnesota Electronic Commerce Conference, Mar. 27-28, 2001. Minneapolis, MN.

Klepp, JT, Sharing on a Small Screen, Feb. 2008, MoConDi Ltd.

Ko, Young-Bae, et al., Geocasting in Mobile Ad Hoc Networks: Location-Based Multicast Algorithms, Proceedings of the 2nd IEEE Workshop on Mobile Computing Systems and Applications, [undated], pp. 101-110.

Koung-Lung Lin Hsu, J.Y.-J. Han-Shen Huang Chun-Nan Hsu; A recommender for targeted advertisement of unsought products in e-commerce; CEC 2005; Jul. 19-22, 2005; pp. 101-108.

MacEachren, Alan M., et al., Geographic Visualization: Designing Manipulable Maps for Exploring Temporally Varying Georeferenced Statistics, Proceedings of IEEE Information Visualization Symposium, Research Triangle, [undated], pp. 87-94.

Ming, Lok Jing, Peer-to-peer Personalized Mobile Ad Hoc Advertising Framework, Apr. 2005, Malaysia University of Science and Technology.

Muhlhauser, Max, et al. "Collaboration in Opportunistic Networks", Dissertation, Apr. 30, 2007.

Navas, Julio C., et al., Geocast—Geographic Addressing and Routing, Proceedings of the 3rd Annual ACM/IEEE International Conference on Mobile Computing and Networking, [undated], pp. 66-76.

Neumobility, Neutrac Platform, [undated], Seattle, Washington.

(56) References Cited

OTHER PUBLICATIONS

Perich, Filip, et al., Profile Driven Data Management for Pervasive Environments, [undated], pp. 361-370, Database and Expert Systems Applications, Springer Berlin Heidelberg.

PopularMedia, Inc., Comparing Social Media Marketing Tactics: Beyond Viral Videos and Refer-a-Friend Programs, 2008, San Francisco, California.

Purpleace, Ripple Discover, Apr. 2004, Singapore.

Ratsimor, O., et al., eNecentive: A Framework for Intelligent Marketing in Mobile Peer-to-Peer Environments. Oct. 2003. ICEC '03 Proceedings of the 5th International Conference on Electronic Commerce. pp. 87-94.

Ratsimor, O., et al., Intelligent Ad Hoc Marketing within Hotspot Networks. Technical Report TR-CS-03-27. Nov. 2003.

Salim, Ali, et al., "Mobile Advertising a Case study of Mobile advertising Solutions," Bachelor Thesis, 2009, pp. 1-40, Stockholm, Sweden.

Sheshagiri, Mithun., et al., Using Semantic Web Services for Context-Aware Mobile Applications, MobiSys 2004 Workshop on Context Awareness, [undated].

Shojima, Taiki, et al. "An Incentive Attached Peer to Peer Electronic Coupon System", Studies in Informatics and Control, vol. 13, No. 4, Dec. 2004.

Silverpop, Share-to-Social, www.silverpop.G0m/whatweoffer/capabilities/share_to_social.html http://web.archive.org/web/20081005061634/http://www.silverpop.com/whatweoffer/capabilities/share_to_social.html, [undated].

Skyhook Wireless, "Skyhook is Location," undated, www.skyhookwireless.com.

StrongMail Influencer http://strongmail.com/technology/influencer/index.php web.archive.org/web/20091012003154/http://strongmail.com/technology/influencer/index.php, [undated].

Tveit, Amund, Peer-to-peer based Recommendations for Mobile Commerce, Proceedings of the 1st International Workshop on Mobile Commerce, ACM, Jul. 2001, pp. 26-29.

Varshney, Upkar, et al., Mobile Commerce: Framework, Applications and Networking Support, Mobile Networks and Applications, 2002, pp. 185-198, vol. 7, No. 3.

Xu, Heng, et al., "Perceived effectiveness of text vs. multimedia Location-Based Advertising messaging," Int. J. Mobile Communications, pp. 154-177, 2009, vol. 7, No. 2, Inderscience Enterprises Ltd.

"MobiPromo White-Label Wi-Fi Marketing System," MobiPromo System, (undated), http://mobipromosystem.com/mobipromo-system//#tab-id-2.

Aigner, Manfred Dominikus, Sandra Feldhofer, Martin; A System of Secure Virtual Coupons Using NFC Technology; PerCom Workshops '07. Mar. 19-23, 2007; pp. 362-366.

† cited by third party

SYSTEM AND METHOD FOR ADVERTISING DISTRIBUTION THROUGH MOBILE SOCIAL GAMING

CROSS-REFERENCE TO RELATED APPLICATIONS

This application is a continuation-in-part of U.S. patent application Ser. No. 14/042,319, filed Sep. 30, 2013 and claims priority to U.S. Provisional Patent Application No. 61/859,107, filed Jul. 26, 2013. Each of the above-identified patent applications is incorporated herein by reference in its entirety to provide continuity of disclosure.

BACKGROUND AND SUMMARY OF THE INVENTION

It is well known that traditional advertising media such as newspapers, public radio and television has suffered a dramatic decrease in popularity and advertising effectiveness with the advent of the internet and mobile phone technology. Sponsors, therefore, are highly motivated to identify new methods of distributing advertisements in order to create effective brand awareness. As newer technologies such as mobile phones evolve into highly sophisticated two-way communication systems, such technologies can be leveraged to provide trackable advertising impressions and brand awareness by directly displaying advertisements and testimonials to potential customers.

Today, consumers can control which advertisements reach them more effectively than in the past. For example, newer technologies like digital video recorders (DVRs) allow users to skip undesirable advertisements. Similarly satellite radio allows users to listen to music without commercials.

Consumers are increasingly connected to one another through social networking and spend a large percentage of their time interacting with their social network through their mobile phone and tablet devices.

With the declining ability to offer advertisements through traditional broadcast advertising media, this invention provides an advertising system that offers frequent and effective advertising to targeted audiences while immersing the consumers in a mobile social gaming experience.

This invention also provides a system in which recipients are drawn to physically interact with retail sponsors, visit store locations and encouraged to make purchases of products while immersed in the gaming experience.

This invention provides a gaming venue for an advertiser to offer an advertising campaign to one or more social communities.

Other advantages and aspects of the invention will become apparent upon reading the following disclosure.

DETAILED DESCRIPTION

Figure 1:
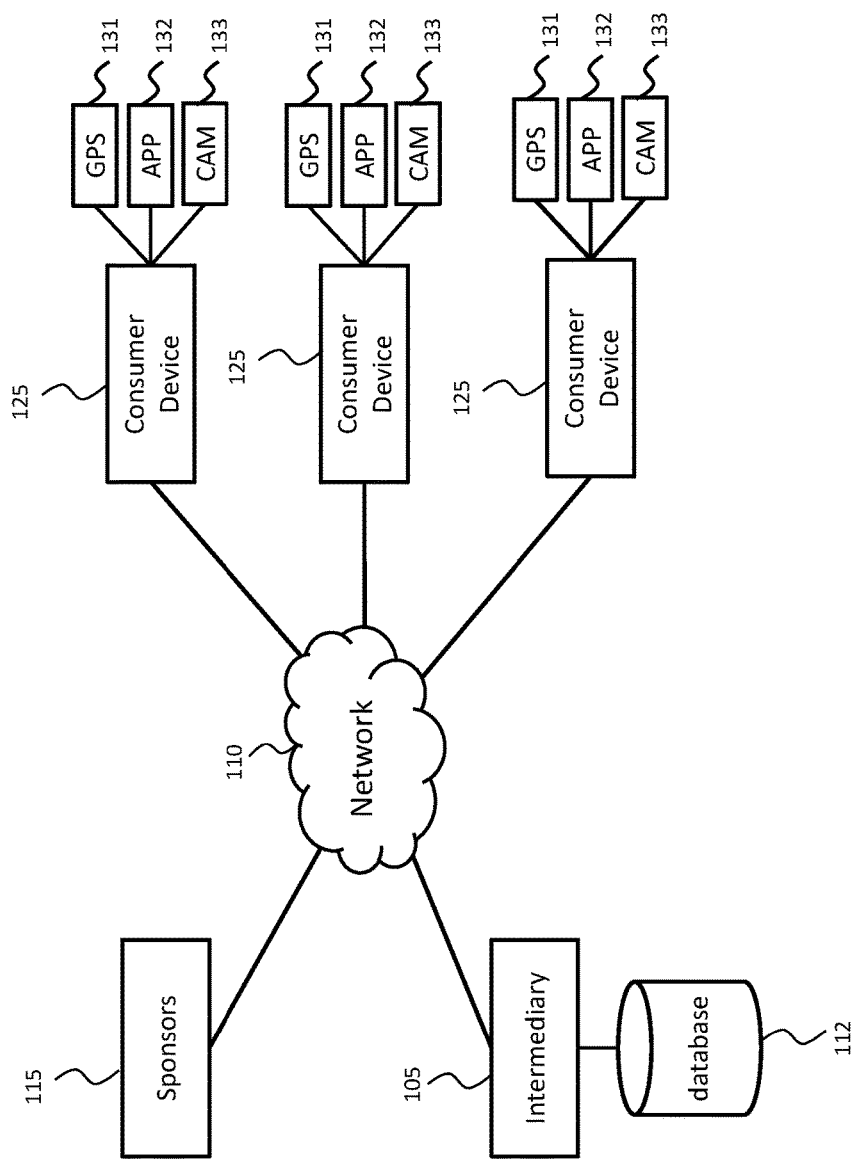
FIG. 1 is a block diagram of a preferred embodiment of a social game system for advertising.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the invention and do not delimit the scope of the invention.

It will be appreciated by those skilled in the art that aspects of the present disclosure may be illustrated and described herein in any of a number of patentable classes or context including any new and useful process, machine, manufacture, or composition of matter, or any new and useful improvement thereof. Therefore, aspects of the present disclosure may be implemented entirely in hardware, entirely in software (including firmware, resident software, micro-code, etc.) or combining software and hardware implementation that may all generally be referred to herein as a "circuit," "module," "component," or "system." Further, aspects of the present disclosure may take the form of a computer program embodied in one or more computer readable media having computer readable program code embodied thereon.

Any combination of one or more computer readable media may be utilized. The computer readable media may be a computer readable signal medium or a computer readable storage medium. For example, a computer readable storage medium may be, but not limited to, an electronic, magnetic, optical, electromagnetic, or semiconductor system, apparatus, or device, or any suitable combination of the foregoing. More specific examples of the computer readable storage medium would include, but are not limited to: a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. Thus, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. The propagated data signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, or any suitable combination thereof.

Computer program code for carrying out operations for aspects of the present disclosure may be written in any combination of one or more programming languages, including an object oriented programming language such as Java, C++, C#, .NET, Objective C, Ruby, Python SQL, or other modern and commercially available programming languages.

Aspects of the present disclosure are described with reference to flowchart illustrations and/or block diagrams of methods, systems and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices including smart phones and tablet devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure provides a method and apparatus for delivering a mobile social game experience that provides a benefit to a set of advertisers to reach multiple social communities with a compelling message and further provides a benefit to the consumer of enhancing their relationships in their social community by immersing them in a game experience with their friends.

Referring to FIG. 1, an intermediary system 105 including a database 112 is connected to a network 110. One or more consumer devices 125, also referred to as communication devices, are connected to the network. Each consumer device is equipped with at least a GPS location device 131, a camera 133 and application 132 operated by the local operating system of the consumer device. Application 132 includes a set of instructions, that when executed by a local processor of the consumer device, carry out steps of methods described below. Other steps of the methods are carried out by a set of instructions executed on the intermediary system. Intermediary system 105 includes one or more servers, computers, and devices that carry out the processes and operations described within the disclosure.

One or more sponsors 115 are connected to network 110. Each sponsor is associated with a set of sponsor locations that provide physical venues for playing a set of games, gathering permits related to the games, and redeeming rewards related to the games as described below. Sponsors 115 includes one or more servers, computers, and devices that carry out the processes and operations described within the disclosure.

Figure 2:
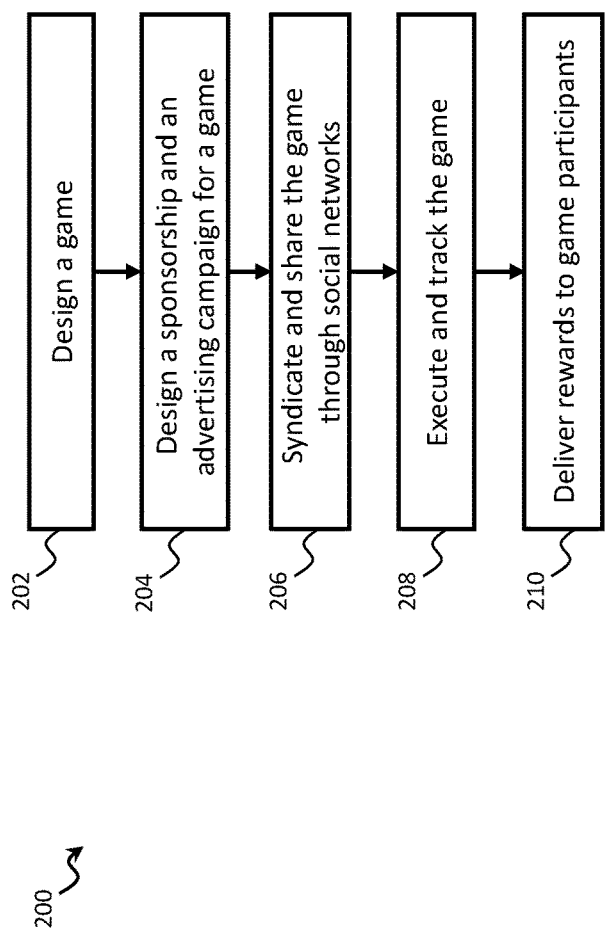
FIG. 2 is a flowchart of a preferred embodiment of a method for advertising using a social game system.

Referring to FIG. 2, a method for advertising 200 through social networks is disclosed. At step 202, a game is designed including a set of rules, a number of participants, a profile for participants, a set of sponsors and a set of sponsored locations, a "skin" for the game, and methods for obtaining rewards. In a preferred embodiment, the set of rules include rules for organizing and equipping participants at one or more sponsored locations to interact with each other while playing the game and while receiving compelling rewards related to an advertising campaign. The "skin" encompasses the graphic design of the game, designed in conjunction with the advertising campaign, for displaying game information on the application on the consumer devices and for displaying information related to the game at the sponsored locations.

At step 204, an advertising campaign is generated for a mobile social game. The advertising campaign includes a set of graphics and textual information such as branding images, websites designs and the like. The advertising campaign also includes a set of rewards and a set of game rules for incentivizing and receiving rewards during a game. Further, the advertising campaign includes a selection of sponsored locations for carrying out a game and coupons for use at a sponsor location while playing the game.

In a first embodiment, there is a one sponsor for one game. The one game may have multiple designs, repeated and implemented multiple times with varying advertising content. In a second embodiment, there are multiple sponsors for one game and the game may be repeated with multiple designs, varying advertising content and various rules and skins. In a third embodiment there are multiple sponsors for multiple games with multiple game designs. In a fourth embodiment, there are multiple games with multiple game designs for one sponsor. The first embodiment is used as the example embodiment in this disclosure; however, the invention should not be limited by this example embodiment.

At step 206, the game from step 204 is syndicated and shared by the sponsor, the participants and their social media communities. The sponsors share the invitations to their existing social media communities and otherwise advertise the game through conventional media. Participants are encouraged to share invitations to play the game as they sign up and interact with the game. This process is simplified by having participants connect the game to their social networks during a sign up process. Rewards related to the playing of the game or related to sponsored products can be distributed at sign-up to encourage participants to share invitations. Advertisements and immediate rewards are made available during the game as the participants interact using their consumer devices.

In some situations, the intermediary will automatically post announcements on the participant's social network, for example, at sign-up and during a game when certain actions occur and/or rewards are earned.

At step 208, the game is executed by the intermediary. The set of consumer devices interact with each other during the game by communication events distributed by the intermediary. The intermediary tracks the location, points, a set of rewards, a winning participant and game related statistics of each participant and confirms actions, awards points, delivers messages and generally executes all the features of the game through communication with the set of consumer devices using the application.

At step 210, the intermediary communicates the set of rewards to game participants through the application. The rewards include redeemable digital coupons. Rewards are delivered during and after the game according to the rules of the game.

Figure 3:
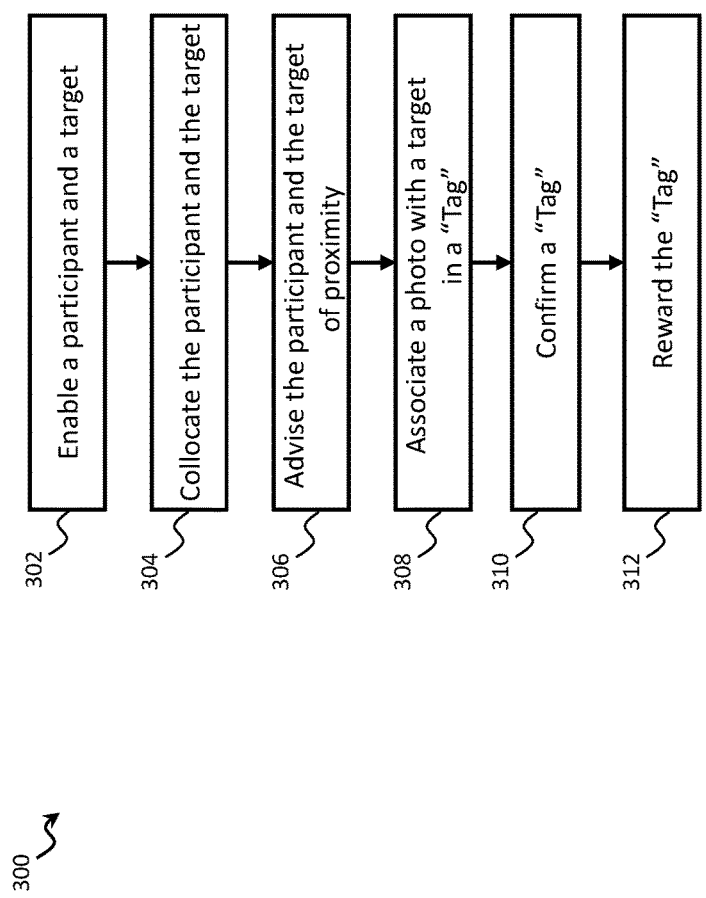
FIG. 3 is a flowchart of a preferred embodiment of a social game in a social game system for advertising.

Referring to FIG. 3, a method 300 of a preferred embodiment of a game is described. At step 302, at least a participant and a target are enabled to play the game. To enable the participant, the application is installed on the consumer device associated with the participant and the participant may be provided an initial number of "permits" to play and a set of instructions to receive additional "permits" as will be further described below. The "target," which is another participant, is similarly enabled.

In an alternate embodiment, the target may be any physically locatable object, which can be enabled, for example by integrating a Quick Reference ("QR") code, Universal Product Code ("UPC"), barcode or other digitally recognizable feature, cross referenced to the consumer device's physical location as known through its internal GPS signal into an actual object or a display of an object. Also, the target can simply be a physical location area enabled via GPS location of the consumer's device.

At step 304, the intermediary tracks the location of the participant and the location of the target to determine if the participant and the target become "collocated." "Collocation" is defined in the rules of the game. In one embodiment, collocation is defined as being within a predetermined physical proximity, for example, a 20 foot radius, at the same time. In an alternate embodiment, collocation means traversing along the same path within a predefined time frame. In one embodiment, the GPS devices of the consumer devices associated with the participant and target is required to report their respective locations to the intermediary during the game. In an alternate embodiment, the locations of the participants may be determined by participant self-reporting a physical location, such as transmitting longitude and latitude data or transmitting a photograph of a landmark or a QR code, to the intermediary.

At step 306, as the game progresses, the participant receives location information from the intermediary advising the participant of the proximity of the target. Similarly, the target receives location information advising the target of the proximity of the participant. Upon collocation, the intermediary further advises both the participant and the target of the collocation.

At step 308, a "tagging event" occurs between the participant and the target. The "tagging event" occurs when the participant sites the target, indicates a "tagging event" on their consumer device and snaps a photo of the target. The target may or may not be another participant. The target may be sent a message from the intermediary indicating the "tagging event".

At step 310, the "tagging event" is confirmed by the participant by sending the photo to the intermediary. The target is provided an opportunity to challenge the "tagging event." If not challenged, the tagging event is "confirmed."

At step 312, the "tagging event" is rewarded by assigning points to the participant based on a point value assigned to the target. Target point value can be different for each participant or the same for all participants based on the rules of the game. At the end of the game, the points are tallied for all the participants of the game and a winner is decided. The winner receives additional rewards based on the number of "tagging events" made and number of points accumulated.

Figure 4:
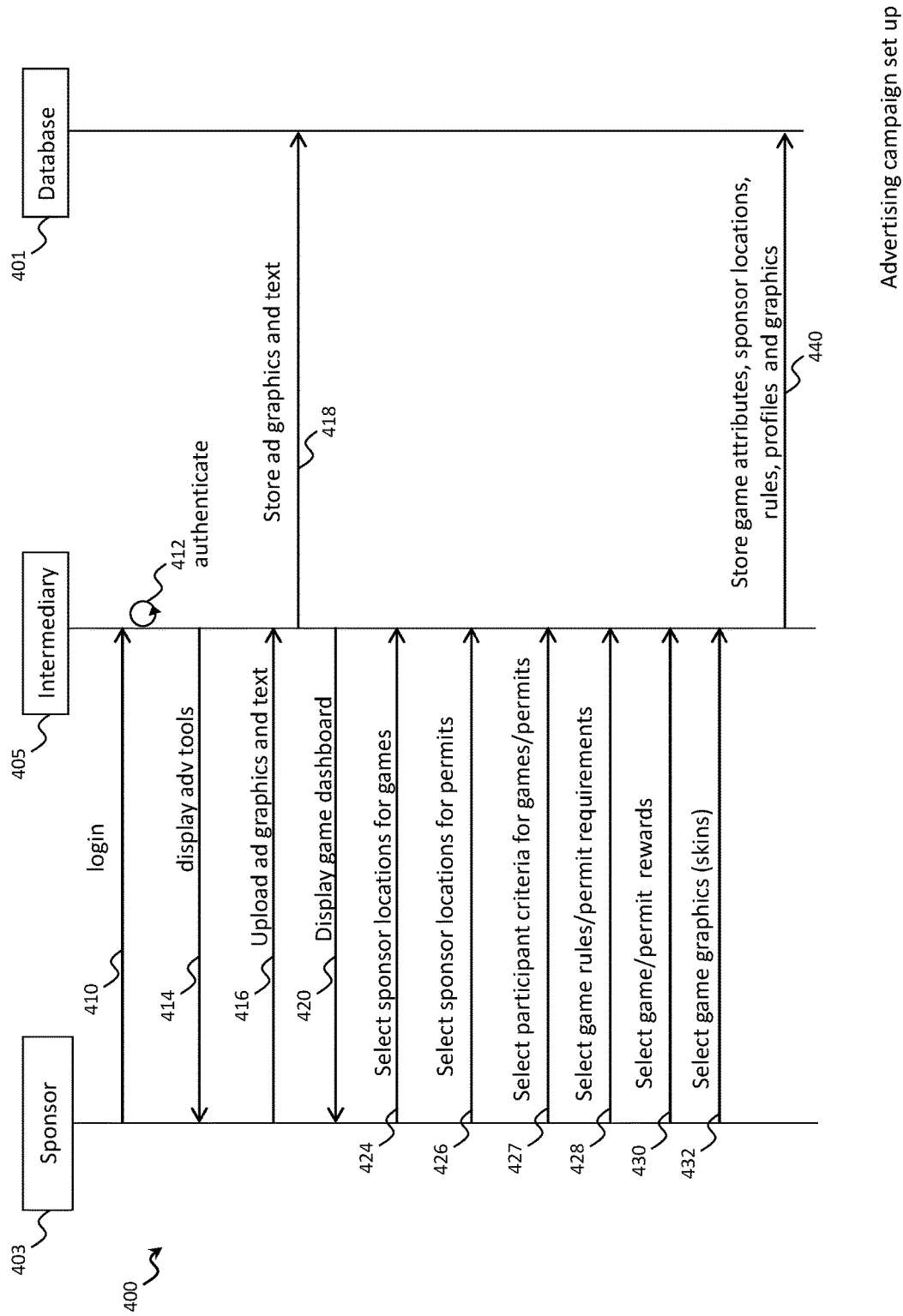
FIG. 4 is a sequence diagram of an advertising campaign set up.

Referring to FIG. 4, a sequence diagram is disclosed for a method to set up an advertising campaign. The method 400 involves sponsor 403, intermediary 405 and database 401. At step 410, the sponsor initiates a login authentication with the intermediary through a web server. The sponsor operates a web client such as a web browser. At step 412, the intermediary authenticates with the sponsor based on a previously agreed set of credentials. At step 414, intermediary displays an advertiser tool for setting up advertising materials. At step 416, the sponsor uploads a set of ad graphics and text to support the advertising campaign. At step 418, the intermediary stores the ad graphics and text to the database.

At step 420, the intermediary displays a game design dashboard on a webpage for the sponsor, including a setting of selections through interactive buttons and dialogs. At step 424, the sponsor selects a set of sponsor locations for hosting game events. At step 426, the sponsor selects a set of sponsor locations for loading permits.

At step 427, the sponsor selects a set of profile criteria for matching participants to games and permits. The set of profile criteria includes selected demographic attributes and other attributes for participants which are used to match the participant to a game opportunity, permit opportunity or other benefit using the profiles of participants. Participants can be matched while requesting to join a game or while obtaining a permit during a game.

At step 428, the sponsor selects a set of game rules from a predefined set of game rules and a set of permit requirements for obtaining permits. An example of a game rule is to allow dynamic adjustment of a participant's target points or place a "bounty" on a participant based on the participant's location, rank, social reach or accumulated points. An example of a permit requirement for a participant during a game is to go to a permit location, take a picture of an object at the permit location and upload the picture to the intermediary. At step 430, the sponsor selects a set of game rewards including when and how the rewards are to be distributed. Rewards can be distributed during many different times in a game experience, for example, at the time of joining the game, at the time of scoring a "tagging event", at the time of entering the sponsor locations while obtaining permits, and at the end of the game.

At step 432, the sponsor selects game graphics. In selecting graphics, a "skin" for the game is selected. A "skin" represents a design theme that is downloaded and installed onto the application of the consumer device which gives a game a particular aesthetic appearance. Also, the sponsor selects the placement of particular images in different aspects of the game. For example, the sponsor chooses a branding image for the game and for the "tagging event" photos.

At step 440, the intermediary collects the selections made by the sponsor and stores the various sets of information that include game attributes, sponsor locations, game rules, rewards and graphics into the database to create a profile for each sponsor.

Figure 5:
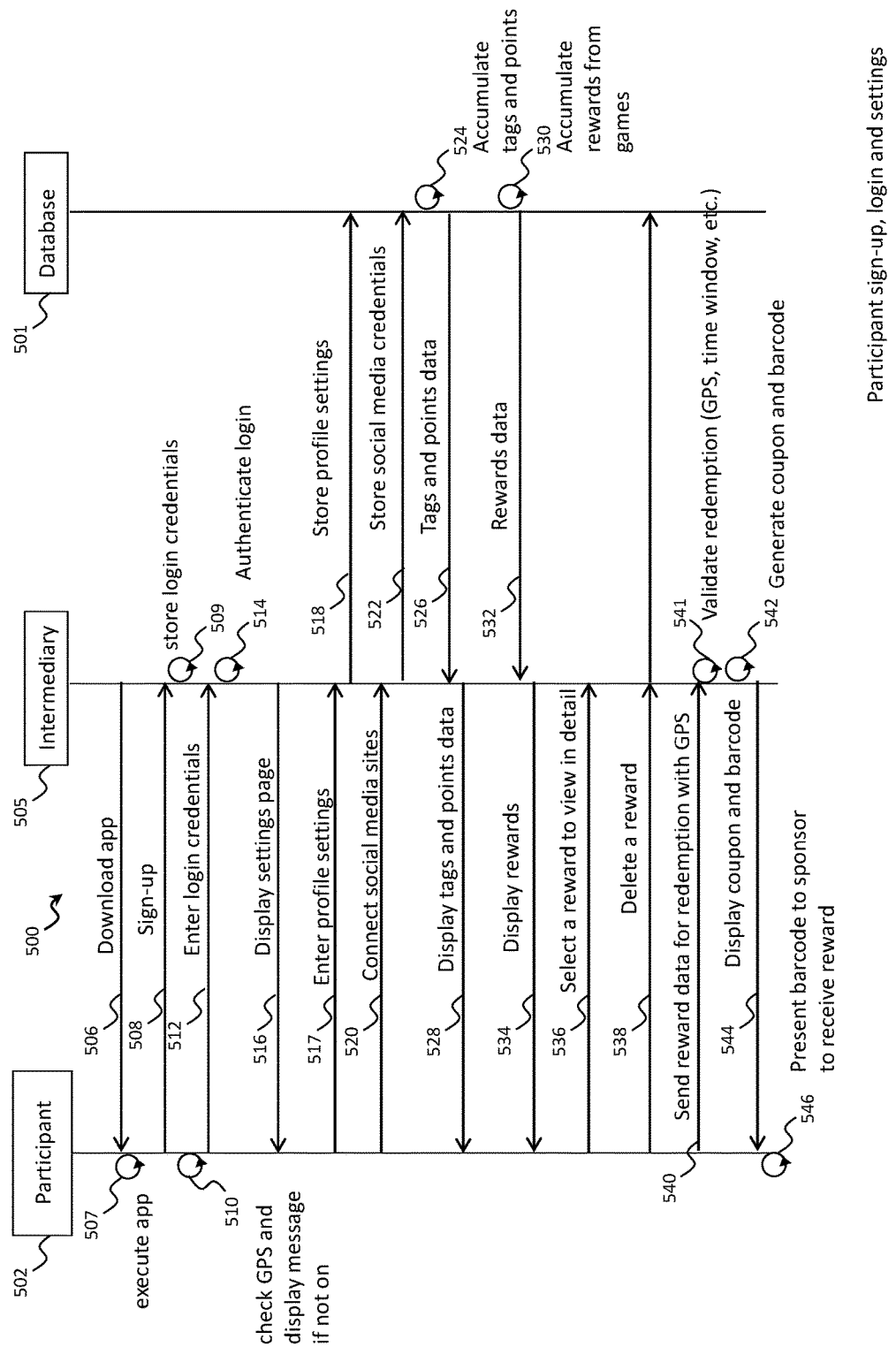
FIG. 5 is a sequence diagram of a participant sign-up, login and settings.

Referring to FIG. 5, a sequence diagram is disclosed for a method for participant sign-up, login and settings process. The method 500 involves participant 502, intermediary 505 and database 501. Participant 502 is a consumer device operated by a consumer. At step 506, a mobile app is downloaded to the consumer device from a mobile app store or the intermediary. At step 507, the mobile app is executed on the consumer device, and at step 508, the participant establishes login credentials. At step 509, the login credentials are validated by the intermediary. At step 510, the login credentials are validated and stored in the consumer device by the mobile app. At step 512, the login credentials are uploaded to database 501.

In an alternate embodiment, at step 511, the login credentials are uploaded as "shared credentials" from a social media site, for example, a Twitter or Facebook site, through Twitter API credentials or Facebook credentials, respectively. The shared credentials for the mobile app are validated by the consumer device and validated by the intermediary. After the first login, steps 508, 509 and 510 may be automatic upon executing the mobile app at step 507.

In another embodiment, the "sign-up" process can be facilitated by a web page served by the intermediary and from which the mobile app is downloaded during the "sign-up" and in which social media site credentials for at least one social media site is entered.

At step 514, the application checks the consumer device to make sure the GPS is enabled. If the GPS is not enabled, a message is displayed to the participant to agree to have GPS turned on. Also, step 514 is performed at any time the participant selects to execute the application and engage in the game experience.

Once the login credentials are validated and the GPS is turned on, then at step 516, a display settings page is presented to the participant. At step 517, a set of profile information is configured by the participant. The set of profile information includes demographic data for the participant and general information required to match the participant to a game opportunity, permit opportunity or other benefit. The set of profile information is matched with profile criteria selected by the sponsors of a game. At step 518, the set of profile information is stored in the database.

In a preferred embodiment, steps 517 and 518 are accomplished automatically by the intermediary by uploading the participant profile from a social media site, using the shared credentials. The profile can be displayed in the displayed settings page for review by the participant and where the participant can add or amend profile data.

At step 520, the participant selects desired social media sites and connects them to the application by supplying a set of login credentials. The consumer device may automatically connect the participant to the primary social media site when executing the mobile app. There may be multiple social media sites connected to the mobile app along with any social media sites already validated. At step 522, the additional shared credentials are stored in the database. In a preferred embodiment, the login credentials for the mobile app are the same as the login credentials for a primary social media site.

At step 524, the database stores permit data for tagging events and stores participant points accumulated from games over time as the consumer participates in games. At step 526, the permit data and points data is used by the intermediary during a game. At step 528, the permit data and points data is transmitted to the participant and displayed.

At step 530, the database stores rewards accumulated from games over time as the consumer participates in games. At step 532, the rewards data is used by the intermediary during a game. At step 534, the rewards data is transferred to the participant and displayed in a list.

At step 536, the participant selects a reward from the list and a set of detail reward information is displayed. At step 538, the participant deletes a reward. The reward is no longer available to be redeemed and removed from the intermediary system and database or flagged as abandoned. At step 540, the participant selects a reward to be redeemed and the reward data and GPS information is sent to the intermediary. At step 541, the reward is validated by checking a set of conditions configured with the reward by the sponsor including, but not limited to, a time and date window condition and a location condition. The participant's location (GPS) is checked to match a location condition. The time is checked to be in a matching time and date window for validity. If validated, then at step 542, the intermediary generates a coupon, and optionally a barcode and/or a redemption validation code. At step 544, the coupon and barcode are displayed by the participant. At step 546, the barcode or redemption validation code is scanned or entered to receive the reward, for example, a sponsor barcode scanner at a point of sale scans the barcode so the consumer can purchase an item using the coupon.

Figure 6:
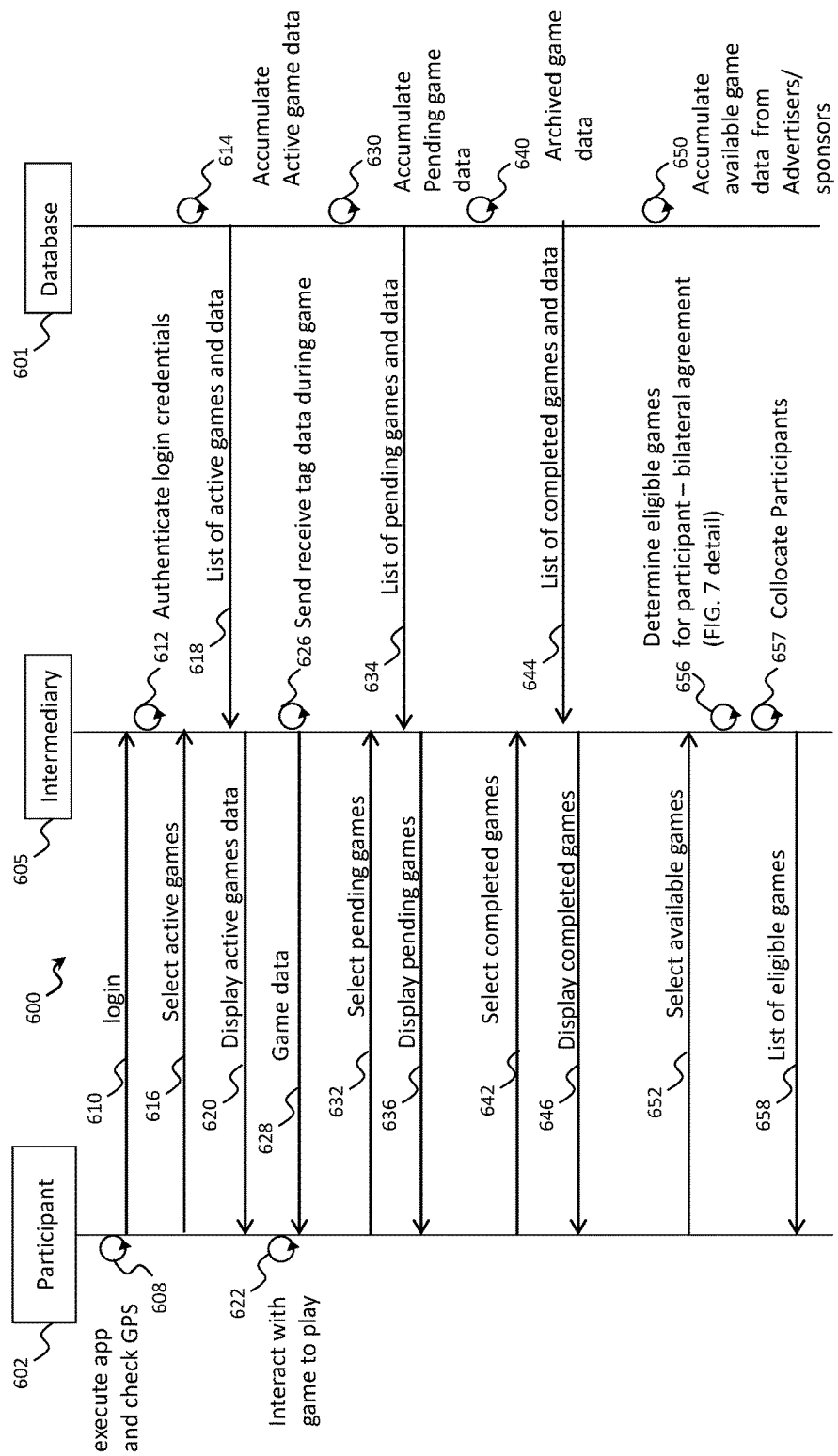
FIG. 6 is a sequence diagram of participant game interactions.

Referring to FIG. 6, a sequence diagram is disclosed for a method for managing multiple games. The method 600 involves intermediary 605 having a database 601 interacting with a participant 602. At step 608, participant launches the mobile app and the GPS capability is checked. At step 610, participant 602 performs a login with intermediary 605 where at step 612, intermediary authenticates the login credentials. In a preferred embodiment, step 610 is performed automatically through a third party, for example, a social media site such as Facebook via Facebook shared credentials.

At step 614, database 601 continuously accumulates active game data for all participants in all active games. At step 616, the participant selects to view active games. At step 618, intermediary retrieves a list of active games and the active game data from the database and at step 620, the intermediary forwards, to the participant for display, the list of active games in which the participant is involved along with the active game data.

At step 622, the participant selects an active game and interacts with other participants in the active game. During the interaction (step 626) the intermediary sends and receives game data including "tagging events" and messages related to "tagging events." At step 628, the intermediary transmits the game data to the participant for display.

For games that are pending to start, the database at step 630, accumulates a list of pending games and associated pending game data. At step 632, participant 602 selects to view pending games. At step 634, intermediary 605 retrieves the list of pending games for which the participant has joined and the associated pending game data. At step 636, the intermediary transmits, to the participant for display, the list of pending games for the participant and the associated pending game data.

As each game finishes, at step 640, the database continuously archives completed game data including rankings, statistics, winner information and reward information. At step 642, participant 602 selects to view completed games. At step 644, the intermediary retrieves the completed game data for the participant from the database and at step 646, transmits the completed game data to the participant for display.

The participant is provided an opportunity to join available games. At step 650, the database accumulates new games as they are specified by sponsors and placed on a schedule. At step 652, participant 602 selects to view a set of available games. At step 656, the intermediary determines a list of eligible games and eligible game information from the database. In a preferred embodiment, the list of eligible games is determined based on a bilateral agreement (as will be further described) between participant profiles and sponsor profile criteria.

At step 657, a particular game may require that the participant complete a prerequisite game to be eligible or that participants requesting to play are geographically located within a geographic area. At step 658, the intermediary transmits, to the participant a list of games for which the participant is eligible to play.

Figure 7:
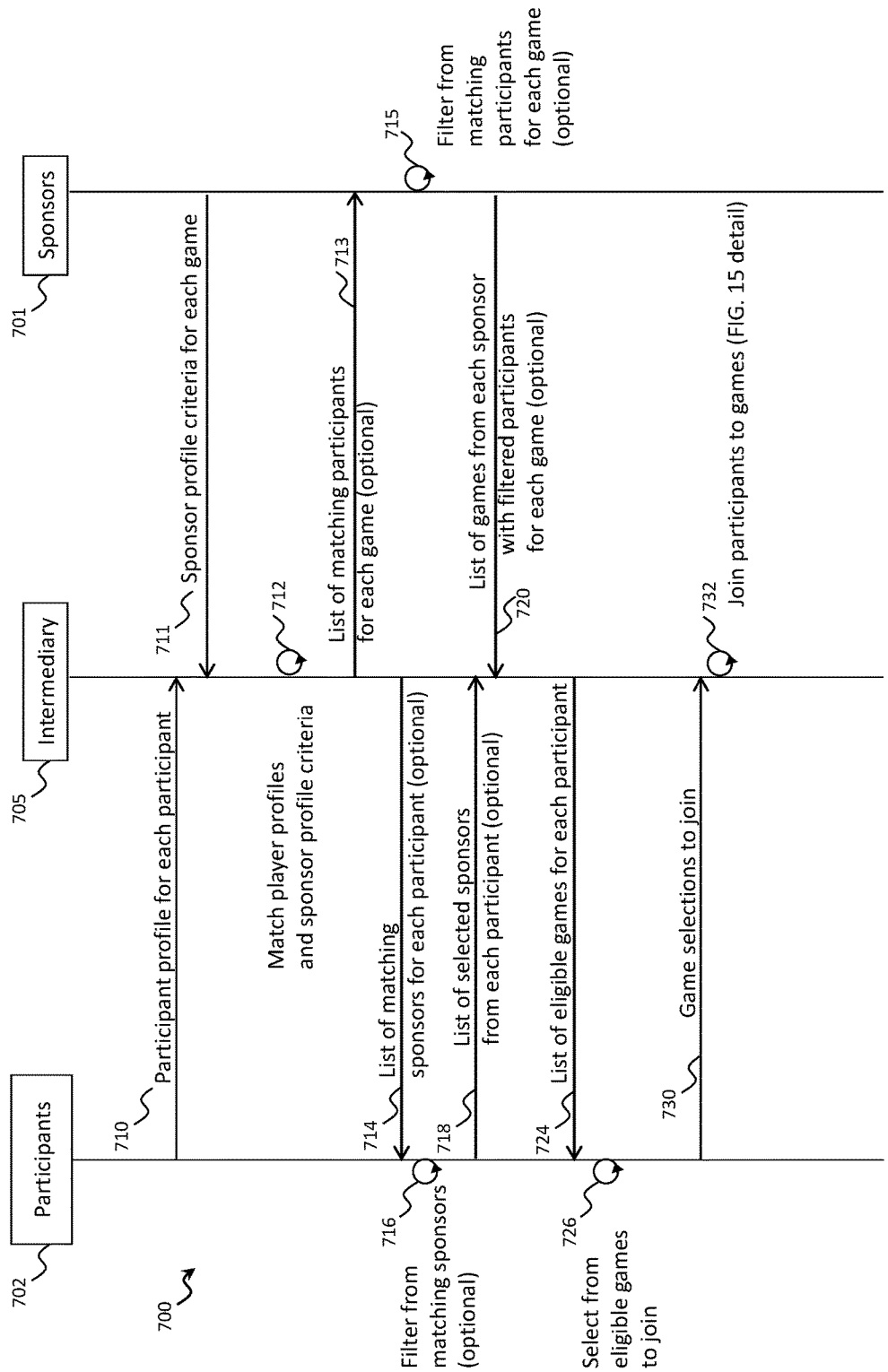
FIG. 7 is a sequence diagram of a bilateral agreement process for games.

Referring to FIG. 7, a preferred embodiment of a bilateral agreement process for determining game eligibility and joining a game is disclosed. Process 700 involves intermediary 705 in communication with set of sponsors 701 and set of participants 702. At step 708, the sponsor chooses a set of games and a profile criteria for each game. At step 710, the intermediary receives a participant profile for each participant, and according to step 711, the intermediary receives a profile criteria for each game from each sponsor. In a preferred embodiment, there can be multiple sponsors for a single game, each sponsor having their own profile criteria. The participant profile can include demographic information relating to the participant, including, but not limited to: age, gender, personal preferences, geographic location, income, sports preferences, and so on. The sponsor profile criteria can include preferred participant demographic information, geographic location of the venue, goods and services available at the venue, and so on.

At step 712, the intermediary compares and matches the participant profiles with the profile criteria. The result of step 712 is a list of matching participants for each game, a list of matching sponsors for each participant and a list of eligible games for each participant. In a preferred embodiment, optional steps 713-719 are not performed. These optional steps will be described below. The matching can include a matching one or more elements of the participant profile and the sponsor profile.

At step 724, the list of eligible games, information about the games, such as the date and time, and other relevant information, the venue for the game including a geographic location, and goods and services available at the venue, is transmitted to the participant. The list of eligible games can include the token or link for inclusion in a communication to a second participant device, as will be further described in FIGS. 18A through 18C.

At step 726, the participant makes a selection of games to join from the list of eligible games. At step 730, the selection of games is received by intermediary 705. At step 732, a process for joining the participant to the game is performed. It should be understood that step 730 completes a bilateral matching agreement where participants, that were selected for games by sponsors through profile criteria, have chosen one or more games to join.

In a first alternate embodiment, at step 713, the list of matching participants for a game is transmitted to each sponsor of the game. At step 715, a sponsor filters participants from the list of matching participants to arrive at a selection of participants for the game. At step 718, the selection of participants for the game is sent to the intermediary. At step 719, the list of eligible games is restricted based on the filtered selection of participants.

In a second alternate embodiment, at step 714, the list of matching sponsors for a participant is sent to the participant. At step 716, the participant makes a selection of sponsors from the list of matching sponsors. At step 717, the selection of sponsors is sent to the intermediary. At step 719, the list of eligible games for the participant is restricted to those games sponsored by the selected sponsors.

Figure 8:
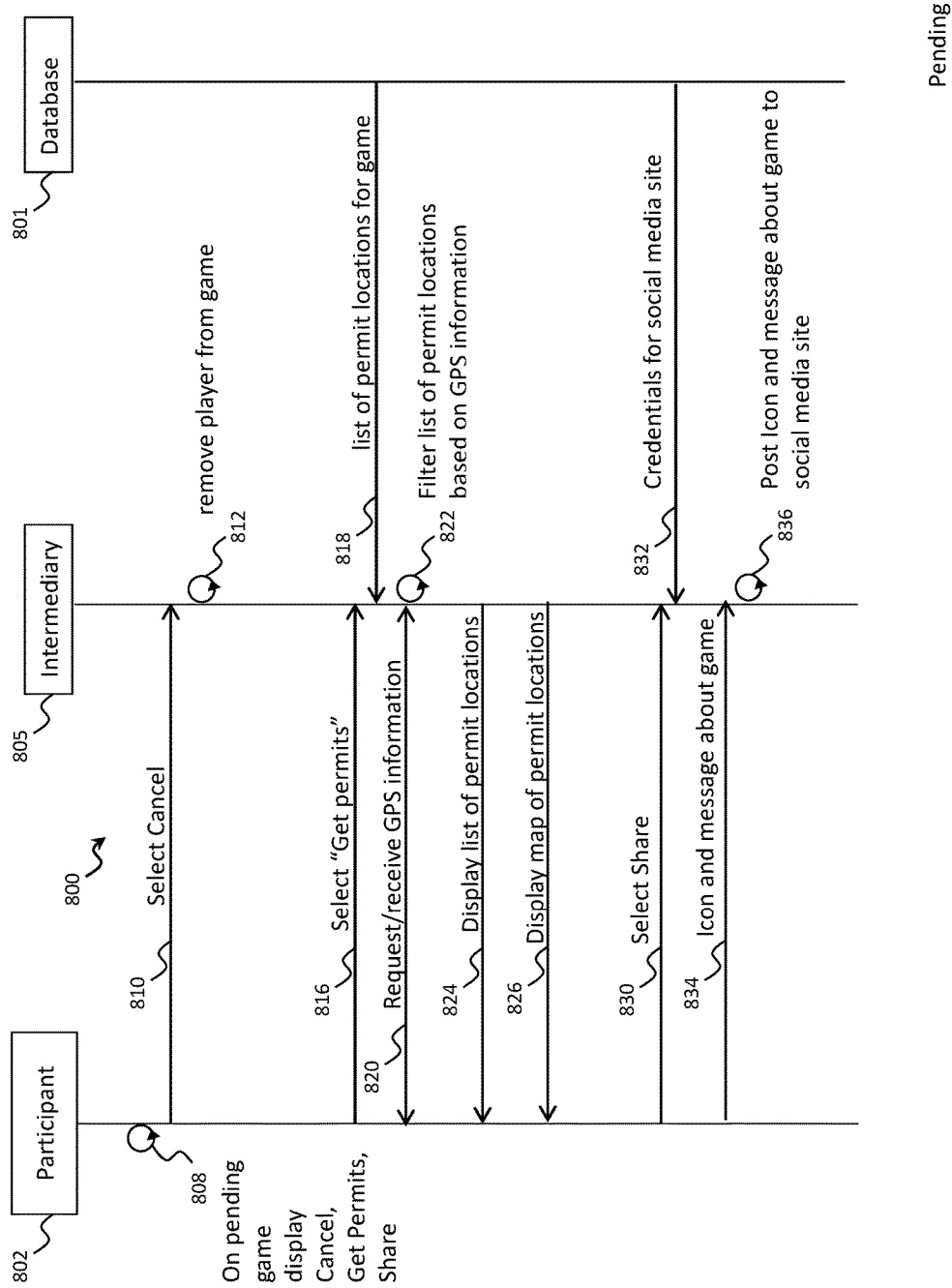
FIG. 8 is a sequence diagram of pending games interaction.

Referring to FIG. 8, a sequence diagram is disclosed for a method for managing pending games that occurs prior to active game participation. The method 800 involves intermediary 805 having a database 801 interacting with a participant 802. The method assumes that the participant has logged in with the intermediary and has selected to view pending games as in step 636. Then, at step 808, participant 802, selects to display detailed pending game information for a pending game which includes the ability to cancel the pending game, get permits for the pending game and share the pending game.

At step 810, the participant chooses to cancel the pending game and at step 812, the intermediary removes the participant from the pending game.

At step 816, the participant selects to "get permits". A permit is a permission to "tagging event" another participant during a game. Permits may be game specific or they may be general. The participant must accumulate permits prior to and during a game, in order to complete a "tagging event" and fully participate in the game. If the participant runs out of permits, then he/she can no longer complete tagging events; however, others may complete a tagging event with the participant. Permits are obtained by visiting locations and following a prescribed process as explained in more detail below.

At step 818, the intermediary retrieves a list of permit locations for the pending game. At step 820, the intermediary requests and receives GPS coordinate information from the participant. At step 822, the intermediary filters the list of permit locations based on the GPS coordinate information, sorting the list in order of proximity to the participant. At step 824, the list of permit locations is displayed for the participant and an option to view a map of the permit locations is provided. If the participant chooses to do so, at step 826, a map of the permit locations is displayed for the participant. Additional information can be included with the list of permit locations, such as the number of permits available per location, time limits and any other restrictions that may apply in order to obtain permits.

At step 830, the participant selects to share the pending game with their social media community. At step 832, the intermediary retrieves the set of credentials for social media sites to which the participant is connected. At step 834, the participant creates an invitation message to join the game, including an icon or branding image associated with the game. The participant further selects a social media site and forwards the message to the intermediary. The intermediary, at step 836, then posts the invitation message to at least one selected social media site.

Figure 9:
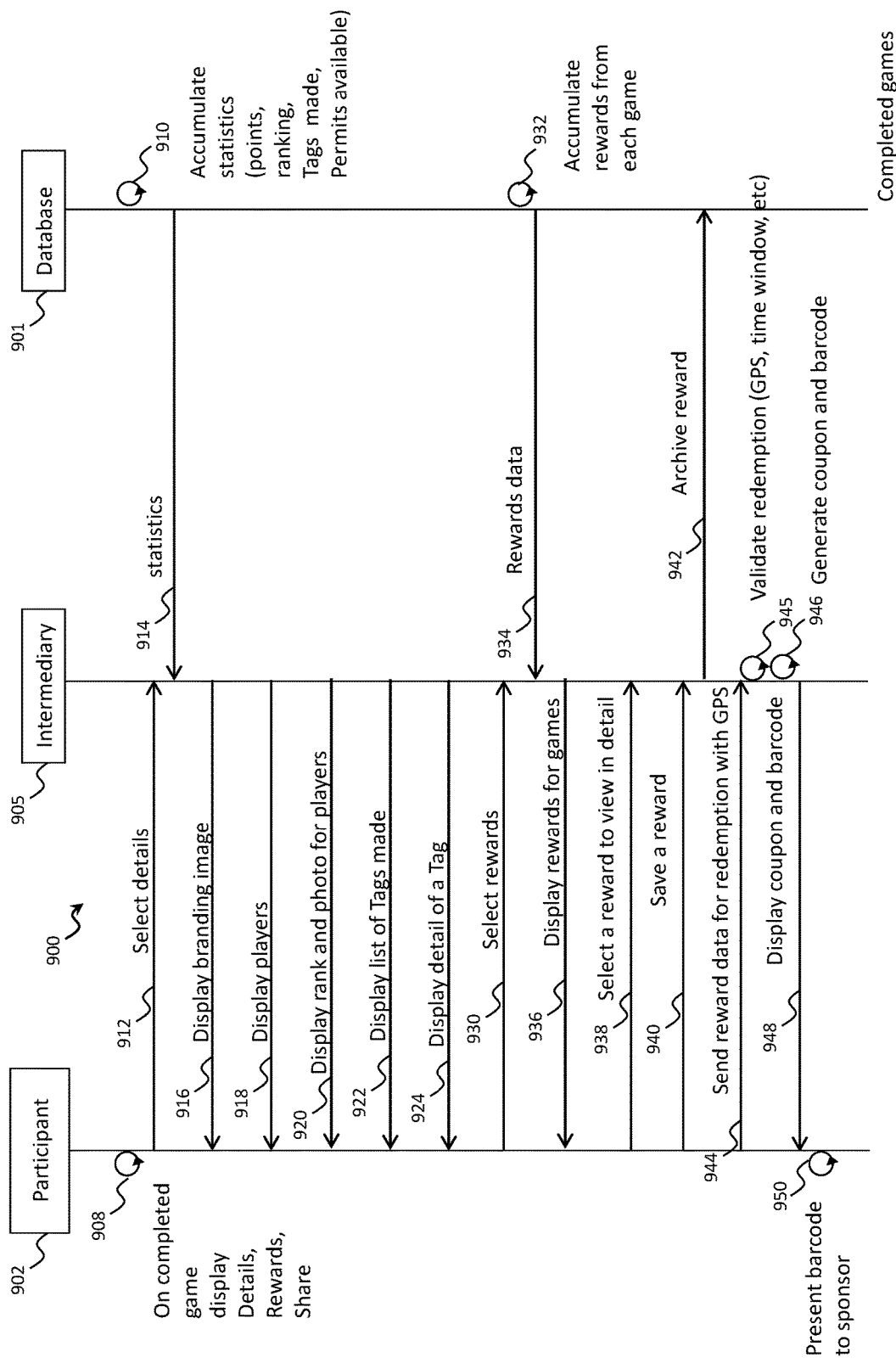
FIG. 9 is a sequence diagram of completed games interaction.

Referring to FIG. 9, a sequence diagram is disclosed for a method for managing completed games that occurs after active game participation. The method 900 involves intermediary 905 having a database 901 interacting with a participant 902. The method assumes that the participant has logged in with the intermediary and has selected to view completed games as in step 646. At step 908, participant 902, selects to display detailed completed game information for a completed game which includes the ability to get details about the completed game, redeem rewards from the completed game and share information about the completed game.

At step 910, the database accumulates information about all games which are complete, including statistical information such as points, ranking, "tagging events" made and unused permits. At step 912, the participant selects to view details about the completed game. At step 914, a set of statistics for the completed game is retrieved by the intermediary from the database and transmitted to the participant. At step 916, a branding image associated with the completed game is displayed for the participant. At step 918, a list of players who participated in the game is also displayed. At step 920, the ranking and a photo for each player in the list of players is also displayed. At step 922, a list of "tagging events made" by the participant is displayed for the participant, and if a "tagging event made" is further selected, then at step 924, details about that tagging event are also displayed. For example, the target's photo is displayed.

At step 930, the participant selects to view rewards obtained during the completed game. At step 932, the database archives the rewards obtained by all the participants for each completed game. At step 934, the intermediary retrieves rewards data for the completed game and forwards the rewards data to the participant. At step 936, the participant displays the rewards data including a list of rewards.

At step 938, the participant selects a particular reward in the list of rewards to view in detail. At step 940, the participant selects to save the particular reward. Upon saving the particular reward, the intermediary, at step 942, archives the saved reward in the database for later retrieval by the intermediary and participant for redemption.

At step 944, the participant selects to immediately redeem the particular reward and reward data is transmitted to the intermediary along with the current GPS coordinates. At step 945, the reward is validated by checking a set of conditions configured with the reward by the sponsor including, but not limited to, a time and date window condition and a location condition. The participant's location (GPS) is checked to match a location condition. The time and date is checked to be in a matching time and date window for validity. If validated, then at step 946, the intermediary generates a coupon and a barcode. At step 948, the coupon and barcode are displayed by the participant. At step 950, the barcode is scanned to receive the reward, for example, a sponsor barcode scanner at a point of sale scans the barcode so the consumer can purchase an item using the coupon.

Figure 10:
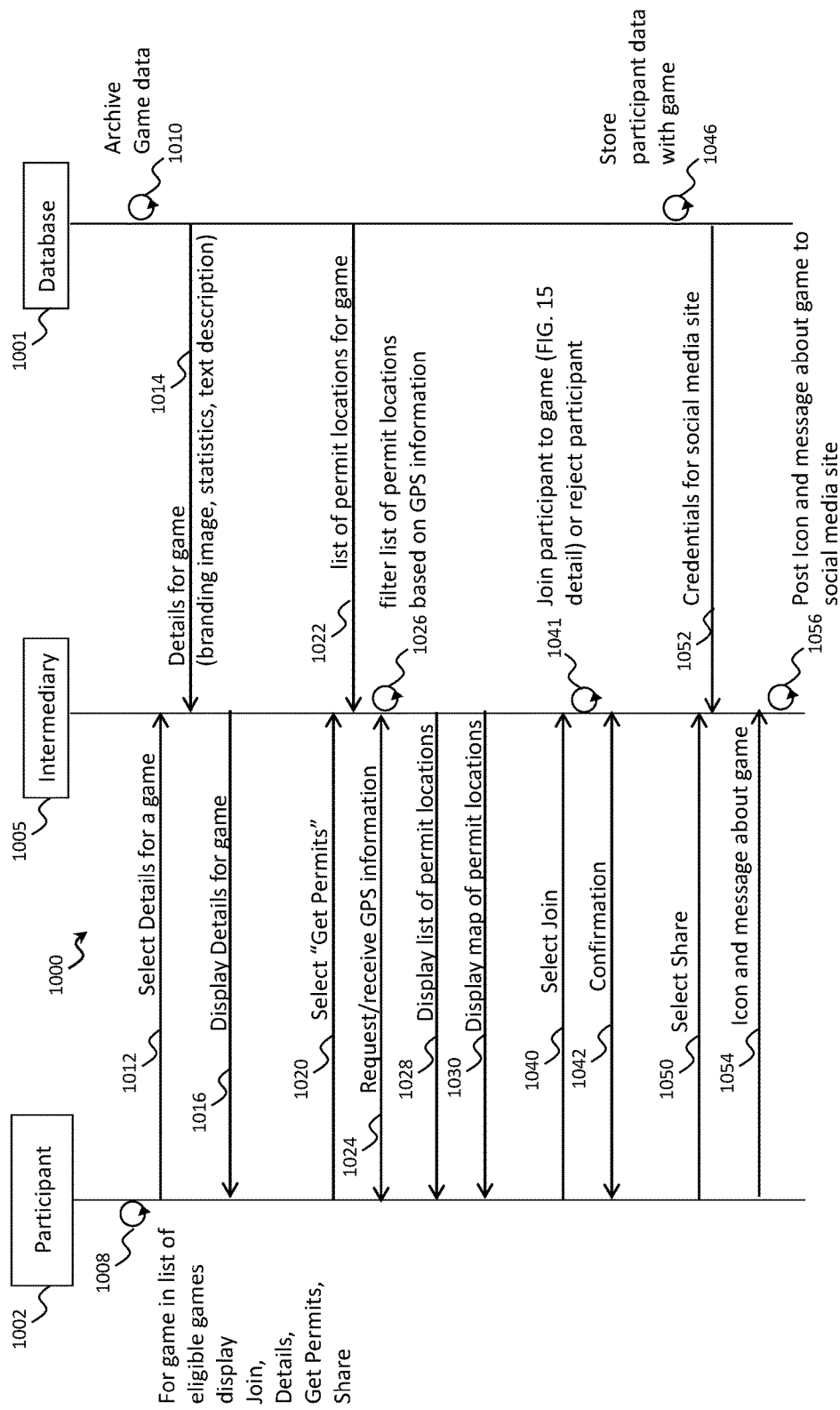
FIG. 10 is a sequence diagram of available games interaction including joining an available game.

Referring to FIG. 10, a sequence diagram is disclosed for a method for managing and joining games which the participant is eligible to play. The method 1000 involves intermediary 1005 having a database 1001 and interacting with a participant 1002. At step 1008, participant 1002, selects to display detailed game information for games which includes the ability to join a game, obtain permits for the game and share information about the game.

At step 1010, the database accumulates information about all games as they are created and posted on a schedule by sponsors. At step 1012, the participant selects to view details for the game. At step 1014, the intermediary retrieves details for the game including a branding image, statistics and a text description. At step 1016, the intermediary forwards the details of the game to the participant for display.

At step 1020, the participant selects to "get permits" for the game. At step 1022, the intermediary retrieves a list of permit locations for the game. At step 1024, the intermediary requests and receives GPS coordinate information from the participant. At step 1026, the intermediary filters the list of permit locations based on the GPS coordinate information, sorting the list in order of proximity to the participant. At step 1028, the list of permit locations is displayed for the participant and an option to view a map of the permit locations is provided. If the participant chooses to do so, at step 1030, a map of the permit locations is displayed for the participant. Additional information can be included with the list of permit locations, such as the number of permits available per location, time limits and any other restrictions that may apply in order to obtain permits.

At step 1040, the participant selects to join a game. At step 1040, the participant may also enter any requested participant information, enter special codes that provide additional upfront permits from a reward, or a code that causes the participant to join a team in a team based game as described below. At step 1041, the intermediary joins the participant to a game or rejects the participant. At step 1042, a confirmation is transmitted. At step 1046, participant information is stored with the game.

At step 1050, the participant selects to share the game with their social media community, for example, to encourage another participant to join alongside them in the game. At step 1052, the intermediary retrieves the set of credentials for social media sites to which the participant is connected. At step 1054, the participant creates an invitation message to join the game, including an icon or branding image associated with the game. The participant further selects a social media site and forwards the message to the intermediary. The intermediary, at step 1056, then posts the invitation message to at least one selected social media site. The participant can also invite friends to join via email, text/SMS message invitations.

Further to the sharing of pending and eligible games, in another aspect of the disclosure, teams of participants can be formed. A particular game may include in its rules, that only teams can play the game, where the size and characteristics of the team may be specified. Thus, at steps 1050, 1052, 1054 and 1056, the application can be put into a "team" mode, whereby the invitations to join are configured with a code, that when shared and then used by the other participants during their join process, causes them to become part of a team. In team mode, the intermediary and the database accumulate team statistics, such as team "tagging events made," team points. Team permits can be obtained and shared among the team members.

Figure 11:
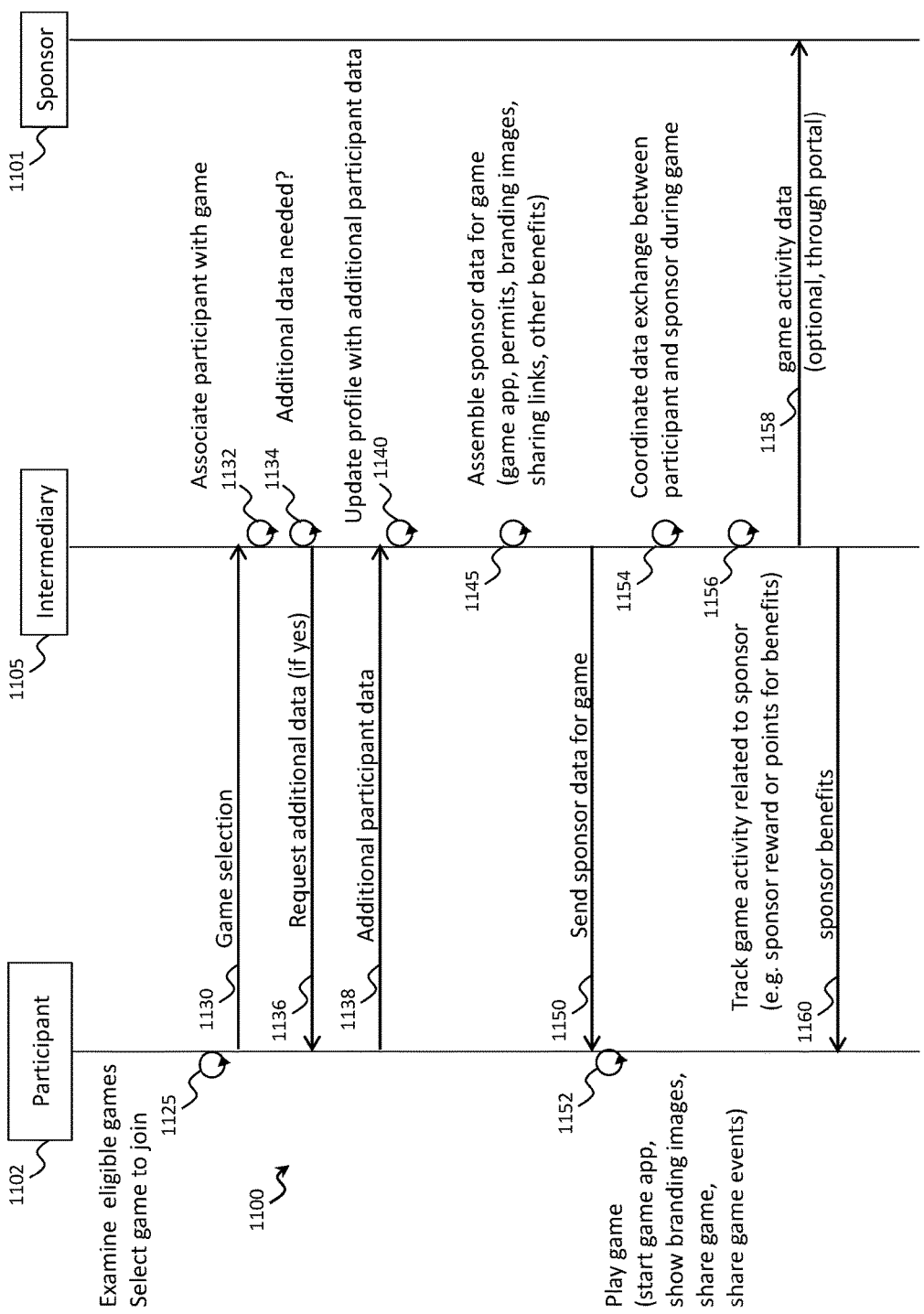
FIG. 11 is a sequence diagram of a process to join a game.

Referring to FIG. 11, a process 1100 for joining a participant to a game is disclosed. At step 1125, a participant makes a selection to join a game. At step 1130, the game selection is received by intermediary 1105. At step 1132, the intermediary associates participant 1102 with the game.

At step 1134, intermediary 1105 determines if additional data is required from participant 1102. If additional data is required, then step 1136 is performed, where a request for the additional data is sent to participant 1102. The additional data can be, for example, additional demographic information, such as interests, sports affiliations, skills or game preferences. At step 1138, the additional data is received by intermediary 1105. At step 1140, the intermediary updates the participant profile for participant 1102, with the additional data. At step 1145, sponsor data for the game is assembled based on the updated participant profile.

The assembled sponsor data includes, but is not limited to, a game skin for the mobile app, permits for the game, branding images and advertisements to be used during communications within the game, links for sharing during the game and other benefits made available to the participant. Also, at step 1145, the intermediary schedules specific branding images and advertisements for game events and communications.

At step 1150, the intermediary transmits a portion of the assembled sponsor data to participant 1102 as needed by the mobile app during game execution. For example, the game skin is transmitted at step 1150.

At step 1152, the participant initiates game play, for example, by starting a game in the mobile app with the game skin, showing branding images, sharing the game with others and sharing game events with the intermediary and with their social media community. This example list of activities is not intended to limit the possible activities of the participant during the game. Many other possible activities are conceived and performed within the scope of this disclosure.

At step 1154, the intermediary coordinates exchange of game data between participant 1102 and sponsor 1101 during the game. At step 1156, the intermediary tracks game activity related to the participant and the sponsor. For example, at step 1156, tagging events and sponsor permits are tracked and game points are accumulated and tracked. Participant data is also tracked at step 1156, such as the number of sponsor advertisements sent during the game, the number and type of branding images sent during the game, coupons earned, coupons redeemed and rankings of the participant within all participants of a game (e.g. in a leaderboard). At step 1158, a portion of the game activity is transmitted to the participant, for example, tagging events, permit events, game points and sponsor benefits such as coupons.

In an alternate embodiment, optional step 1160 is performed where game activity data is transmitted to the sponsor. In the alternate embodiment, the sponsor is provided a web portal to view all game activity data and to select and view statistical information.

Figure 12:
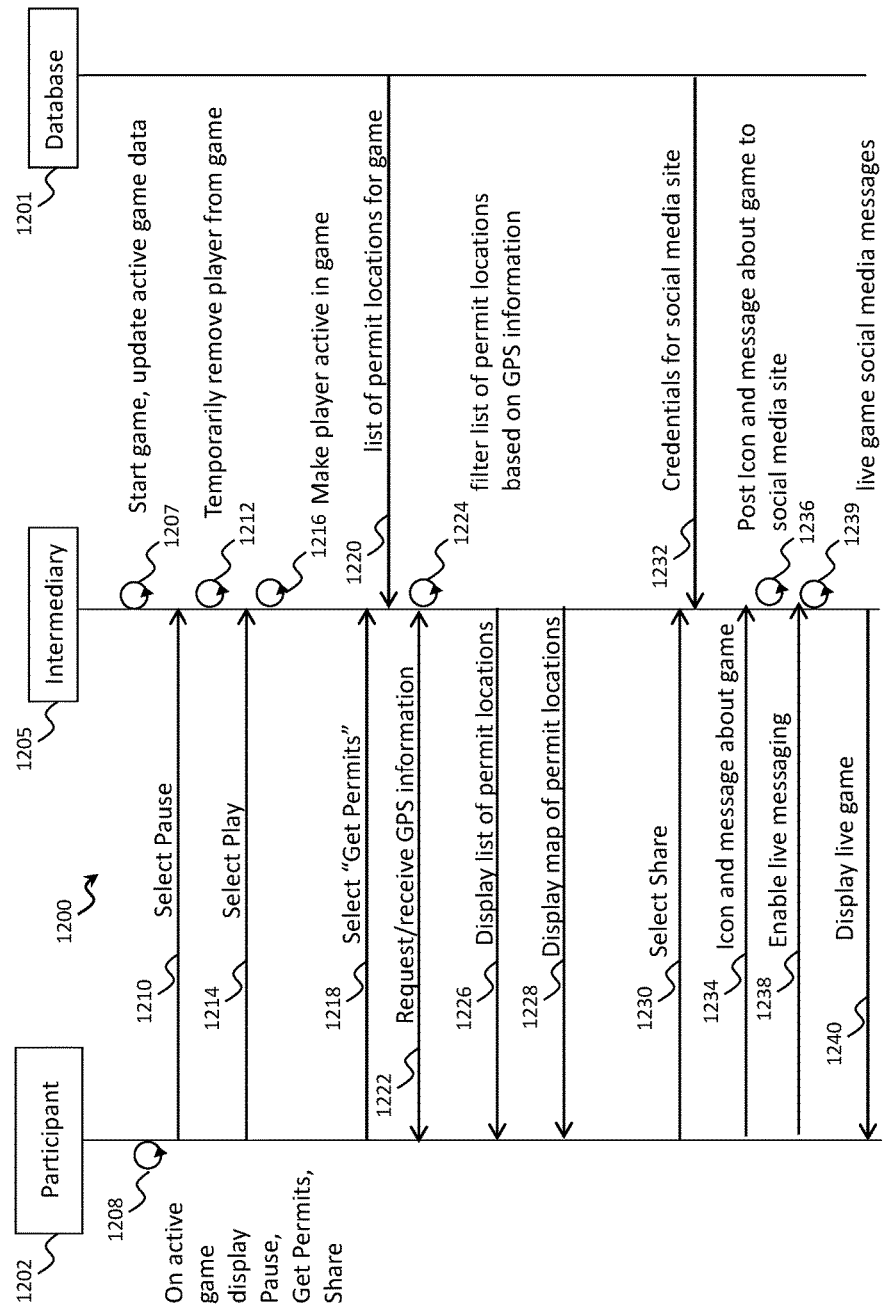
FIG. 12 is a sequence diagram of active game participation.

Referring to FIG. 12, a sequence diagram is disclosed for a method for participating in an active game. The method 1200 involves intermediary 1205 having a database 1201 and interacting with a participant 1202. The method assumes that the participant has logged in with the intermediary and has selected to view active games as in step 616. Also, at step 1207 the game is started by the intermediary, updating active game data until the game ends. At step 1208, participant 1202 selects to display detailed game information for an active game which includes the ability to pause their play in an active game, obtain permits for the active game and share information about the available game.

At step 1210, the participant selects to pause the active game. At step 1212, the intermediary temporarily removes the player from the game, freezing all of the players' statistics. At step 1214, the player selects to play in the active game. The intermediary, at step 1216, responds by making the player visible to other players and active in the game.

At step 1218, the participant selects to "get permits" for the active game. At step 1220, the intermediary retrieves a list of permit locations for the available game. At step 1222, the intermediary requests and receives GPS coordinate information from the participant. At step 1224, the intermediary filters the list of permit locations based on the GPS coordinate information, sorting the list in order of proximity to the participant. At step 1226, the list of permit locations is displayed for the participant and an option to view a map of the permit locations is provided. If the participant chooses to do so, at step 1228, a map of the permit locations is displayed for the participant. Additional information can be included with the list of permit locations, such as the number of permits available per location, time limits and any other restrictions that may apply in order to obtain permits.

At step 1230, the participant selects to share the active game with their social media community, for example, to encourage others to join the game. At step 1232, the intermediary retrieves the set of credentials for social media sites in their social media community. At step 1234, the participant creates an invitation message about the active game, including an icon or branding image associated with the available game. The intermediary, at step 1236, then posts the invitation message to at least one selected social media site or sends invitations via email or SMS/text message methods. At step 1238, the participant enables live game messaging where, at step 1239, social media messages are automatically created by the intermediary and posted to the social media web site, along with tagging event information, photos of participants, advertisements, branding images, sign-up requests, survey opportunities and other content.

Figure 13:
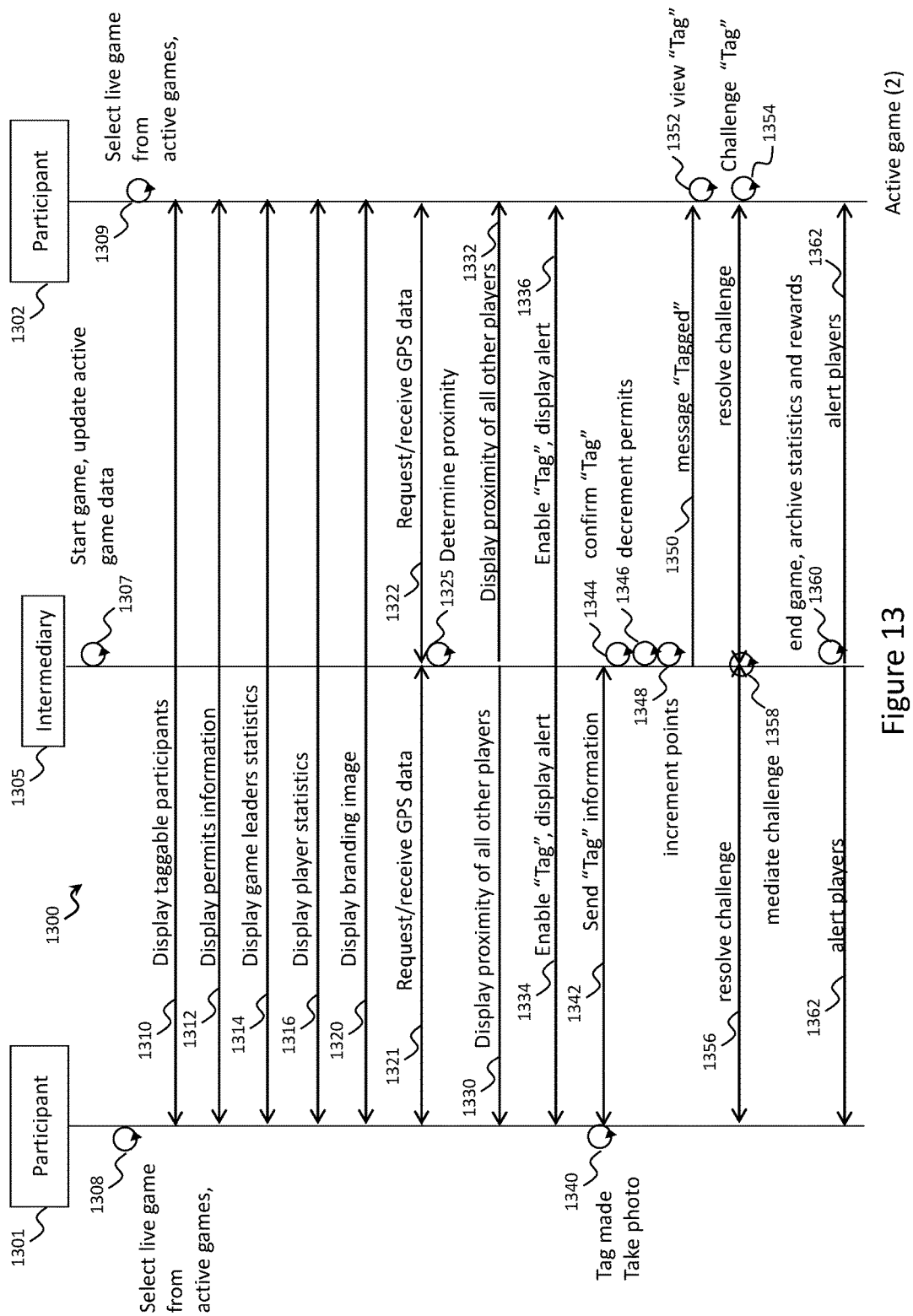
FIG. 13 is a sequence diagram of further active game participation.
Figure 14:
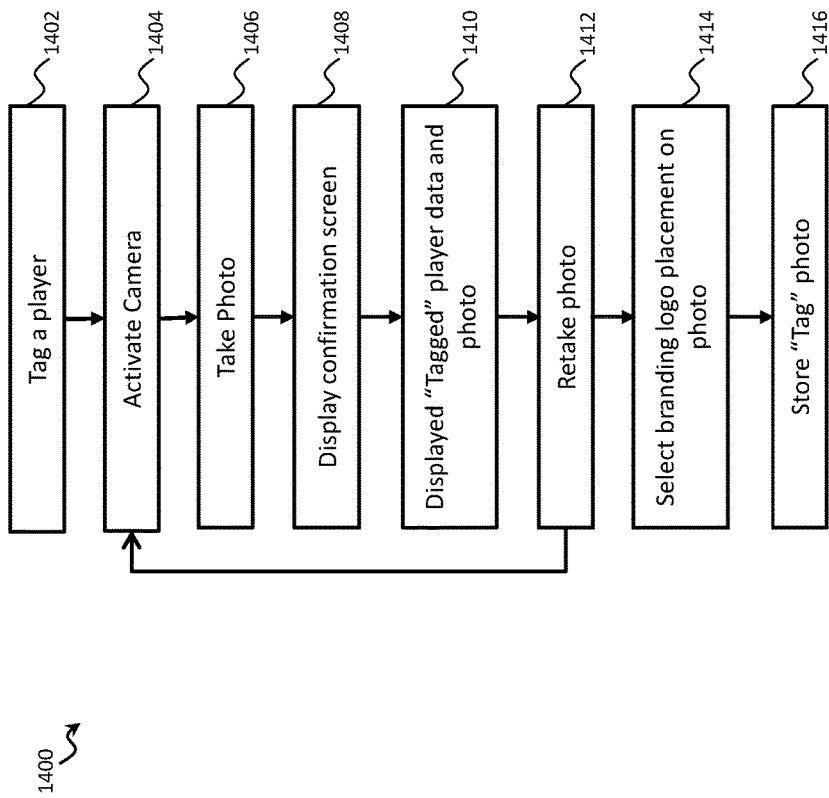
FIG. 14 is a flowchart of a preferred embodiment of confirming a tagging event.

At step 1240, the participant selects to display the live game, which starts another method on the application, as described in FIGS. 13 and 14.

In an alternate embodiment, step 1238 is enabled during the sign-up process for the application or during the process of joining an available game. For example, a sponsor may require the enablement in step 1238 in order to join an available game. In another example, the provider of the application may require the enablement of step 1238 in order to download and install the game on the consumer device, in addition to requiring that GPS subsystem be left on in order to play a game.

Referring to FIG. 13, a sequence diagram is disclosed for a method for playing a game. The method 1300 involves intermediary 1305 having a database (not shown) and interacting with a first participant 1301 and a second participant 1302. The method assumes that both participants have logged in with the intermediary and have selected to engage the live game as in step 1240. At step 1307, a game is started, making it a live game continuously updated with live game data and events. At step 1308, participant 1301 selects to engage in the live game. At step 1309, participant 1302 also selects to engage in the live game. Other participants may also be involved in the live game, but the actions of two participants suffice to show the game operation.

At step 1310, a set of eligible participants is shown on both devices. Although participant 1301 is not shown on his own device and the same for participant 1302.

At step 1312, permits information for participant 1301 is shown to participant 1101 and permits information for participant 1302 is shown to participant 1302.

At step 1314, game leader statistics is shown to both participants.

At step 1316, a set of player statistics is shown to both participants, including ranking, number of tagging events and number of points.

At step 1320, a branding image from the sponsor is displayed to both participants.

At step 1321, GPS location data is requested by the intermediary from participant 1301, captured by a GPS enabled device and received. At step 1322, GPS location data is requested by the intermediary from participant 1302, captured by a GPS enabled device and received. At step 1325, the intermediary determines the proximity of each participant to each and every other participant. At step 1330, the proximity of a first group of participants within a predefined range of participant 1301 is displayed for participant 1301. At step 1332, the proximity of a second group of participants within a predefined range of participant 1302 is displayed for participant 1302.

The participants generally change locations to put themselves into position to snap a picture of the other participants—based on the proximity information. At step 1334, when participant 1301 is within a certain distance of participant 1302, a "tagging event" capability (selectable button) is displayed (or changed color) for participant 1301 to indicate that participant 1302 is in range to complete a tagging event. An alert to this effect may be presented to participant 1301. The alert may be visual, audio or both visual and audio.

At step 1336, when participant 1302 is within a certain distance of participant 1301, the "tagging event" capability is displayed for participant 1302 to indicate that participant 1301 is in range to complete a tagging event. An alert to this effect is presented to participant 1302.

At step 1340, a "tagging event" occurs when participant 1301 makes a "tagging event" of participant 1302 by pressing the selectable "tagging event" button and documenting the "tagging event", for example, with a photo of participant 1302. At step 1342, "tagging event" information is communicated to the intermediary. At step 1344, the intermediary accepts the "tagging event" information and confirms the "tagging event". At step 1346, the number of permits available to participant 1301 is decremented and at step 1348, the number of points for participant 1301 is incremented, according to a "tagging event" value for the "tagging event" as set by the game rules and any other dynamic rules (e.g., participant 1302 designated for bounty).

At step 1350, the intermediary transmits a message to participant 1302 with the information that participant 1301 completed a tagging event with participant 1302. The message includes the photo taken by participant 1301. At step 1352, participant 1302 views the message and the photo and if in dispute, at step 1354, challenges the "tagging event". For example, the "tagging event" may be in dispute if the photo is not of participant 1302. At step 1356, a process to resolve the challenge takes place in an interaction between the intermediary, participant 1301 and participant 1302. In order to resolve disputes, at step 1358, the intermediary receives information about the challenge, sends queries to the participants regarding the challenge, examines timing of the "tagging event" and so forth as needed. It is also conceived that the intermediary may perform facial recognition on the photo in step 1344 to confirm the "tagging event" before forwarding the message to participant 1302 at step 1350 and utilize that information in resolving challenges. At steps 1356 and 1358, the intermediary and the two participants resolve the challenge. Facial recognition may also be used to identify players who may be in a "cloaked" state as participants.

At step 1360, the game ends by concluding a time window or by a particular event occurring in the game. For example, there may be a primary objective of "completing a tagging event" an object or person at an undisclosed location (undisclosed to the participants) while the participants are "completing a tagging event" with one another. When the primary objective is met, the game is ended. At step 1362, all participants are alerted that the game is over and the intermediary tallies the results of the completed game including "tagging events" made, points achieved, permits expended, and so forth.

Referring to FIG. 14, a method 1400 for confirming a tagging event is shown. At step 1402, a player completed a tagging event. In the preferred embodiment, the "tagging event" is initiated when the selectable "tagging event" button is pressed on a participant's device. At step 1404, a camera is activated on the participant's device. At step 1406, a photo is taken of the player using the camera. At step 1408, a confirmation screen is displayed where at step 1410, the photo of the player and a portion of his/her profile information is displayed. At step 1412, if the participant chooses, the photo can be retaken (if possible). At step 1414, a branding image from a sponsor is presented for placement on the photo and the participant is required to place the branding image before continuing the method. At step 1416, the "tagging event" and "tagging event" photo are transmitted to the intermediary and stored in the database. In another embodiment, the intermediary may further confirm the "tagging event" before storing it in the database, for example, by facial recognition.

It should be understood that this disclosure does not limit a "tagging event" to the taking of a photo. For example, audio/video clips can be captured as tagging events. In some game embodiments, audio/video clips and photos from tagging events can be stored in the database and retransmitted as endorsed advertisements for the sponsor or for a sponsor's product.

Figure 15A:
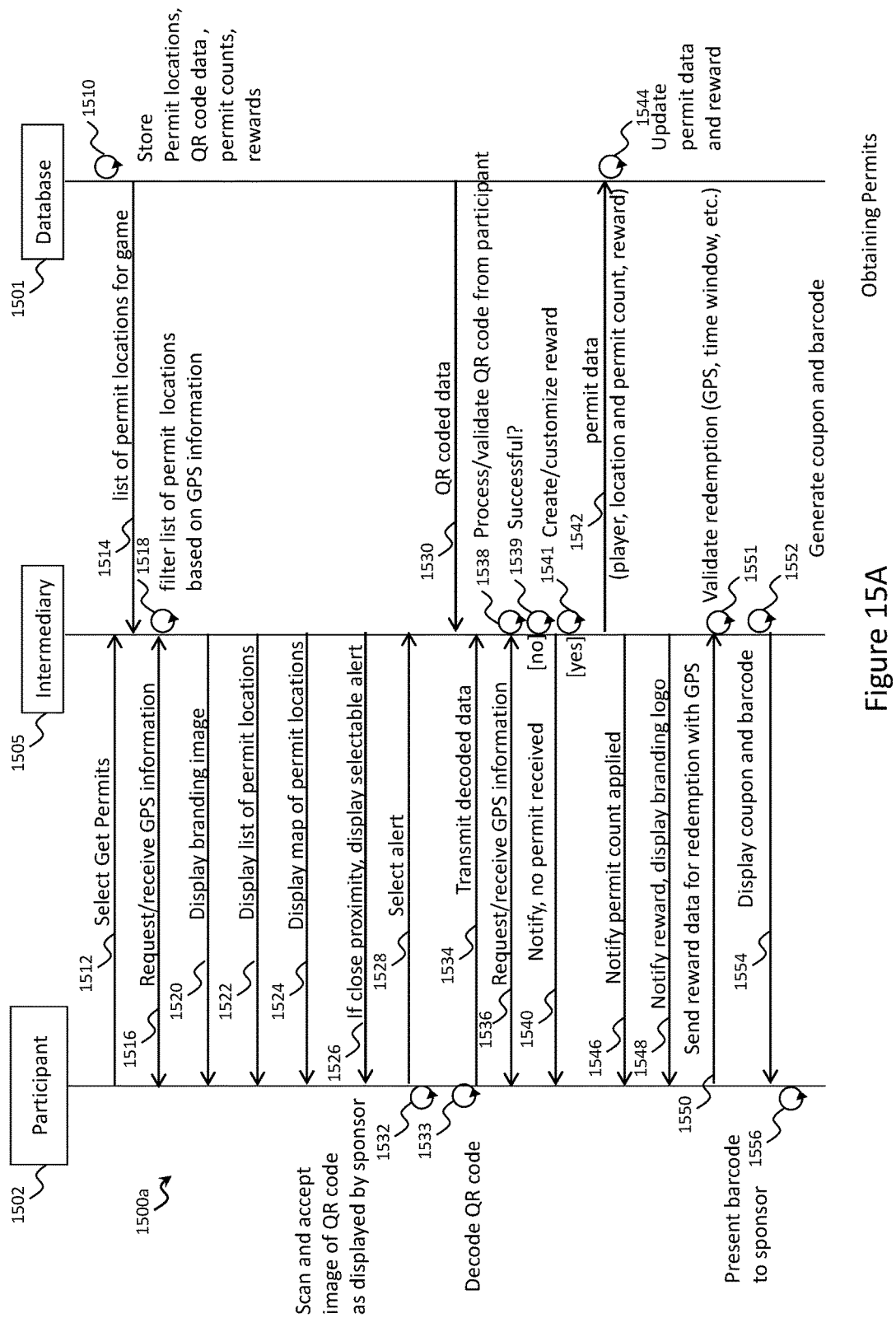
FIG. 15A is a sequence diagram of obtaining permits.

Referring to FIG. 15A, a sequence diagram is disclosed for a method for obtaining permits. In one embodiment, the permit sponsor and the game sponsor are the same. However, in an alternate embodiment, the permit sponsor may be different than a game sponsor for the game associated with a permit. The method 1500a involves intermediary 1505 having a database 1501 and interacting with a participant 1502. The method assumes the participant has logged in with the intermediary and is choosing to get permits as in step 816 of FIG. 8, step 1020 of FIG. 10 and step 1218 of FIG. 12. At step 1510, a set of permit locations, QR, UPC or barcode data, permit counts at each location, and rewards associated with each location are stored in the database. This is typically done at the game design and advertising campaign steps of the process. In other embodiments, the permit data of step 1510 can be dynamic and change with time or with game variables.

At step 1512, the participant selects to "get permits" for a game. At step 1514, the intermediary retrieves a list of permit locations for the available game. At step 1516, the intermediary requests and receives GPS coordinate information from the participant. At step 1518, the intermediary filters the list of permit locations based on the GPS coordinate information, sorting the list in order of proximity to the participant. At step 1520, a branding image for a sponsor of the game is displayed for the participant. At step 1522, the list of permit locations is displayed adjacent the branding image and an option to view a map of the permit locations is provided. At step 1524, a map of the permit locations is displayed. In the preferred embodiment, the participant can switch between a map view and a list view of the permit locations.

At step 1526, for those permit locations that are in close proximity a selectable alert is displayed. Close proximity is defined as within close enough distance to validate the permit. The steps that follow validate the permit.

At step 1528, the selectable alert is selected to initiate a request for a permit and a camera is activated on the participant device. At step 1530, a QR, UPC or barcode data is displayed by a sponsor at a location and associated with the permit location in the database. At step 1532, an image of the QR, bar or UPC code is scanned by the camera and displayed for the participant to accept. Once accepted, at step 1533, the image is decoded to determine a set of decoded data, and at step 1534, the set of decoded data is transmitted to and received by the intermediary. At step 1536, the intermediary also receives GPS coordinate information from the participant.

At step 1538, the intermediary processes the set of decoded data and the GPS coordinates and validates the participant for being collocated with the permit location in the correct time window. If at step 1539, the participant is not validated, then at step 1540, the intermediary notifies the participant that no permit was granted.

If at step 1539, the participant is validated, then a permit is granted and the process continues. At step 1541, a granted permit is created with permit data including the participant, the location, a permit count, an associated game, and a reward if available. If a reward is available for this permit location, the reward may be customized for the participant. At step 1542, the permit data for the granted permit is transmitted to the database and at step 1544 the permit data for the participant and the permit sponsor is updated in the database based on the granted permit.

At step 1546, a notification that the permit was granted along with an updated permit count is transmitted to the participant. If a reward is available, then at step 1548, a notification of the reward is transmitted to the participant and made available for redemption. In a preferred embodiment, redemption is immediately actionable at the permit location. A branding image for the permit sponsor is included with the permit and reward.

At step 1550, the participant selects to redeem the particular reward and reward data is sent to the intermediary along with the current GPS coordinates. At step 1551, the reward is validated by checking a set of conditions for the reward as set by the sponsor including a time and date window condition and a location condition. The participant's location (GPS) is checked to match a location condition. The time and date is checked to be in a matching time and date window for validity. If validated, then at step 1552, the intermediary generates a coupon and a barcode. At step 1554, the coupon and barcode are displayed by the participant. At step 1556, the barcode is scanned to receive the reward, for example, a sponsor barcode scanner at a point of sale scans the barcode so the consumer can purchase an item using the coupon.

Method 1500a discloses use of a QR code with GPS coordinates of the participant for validating the collocation of the participant at a sponsor location. There are many other possible means of collocation that are suitable. For example, a UPC code may be combined with the GPS coordinates, a bar code may be combined with GPS coordinates, a picture of a unique object known to be at the sponsor location may be combined with GPS coordinates or the GPS coordinates are used alone to determine collocation.

Figure 15B:
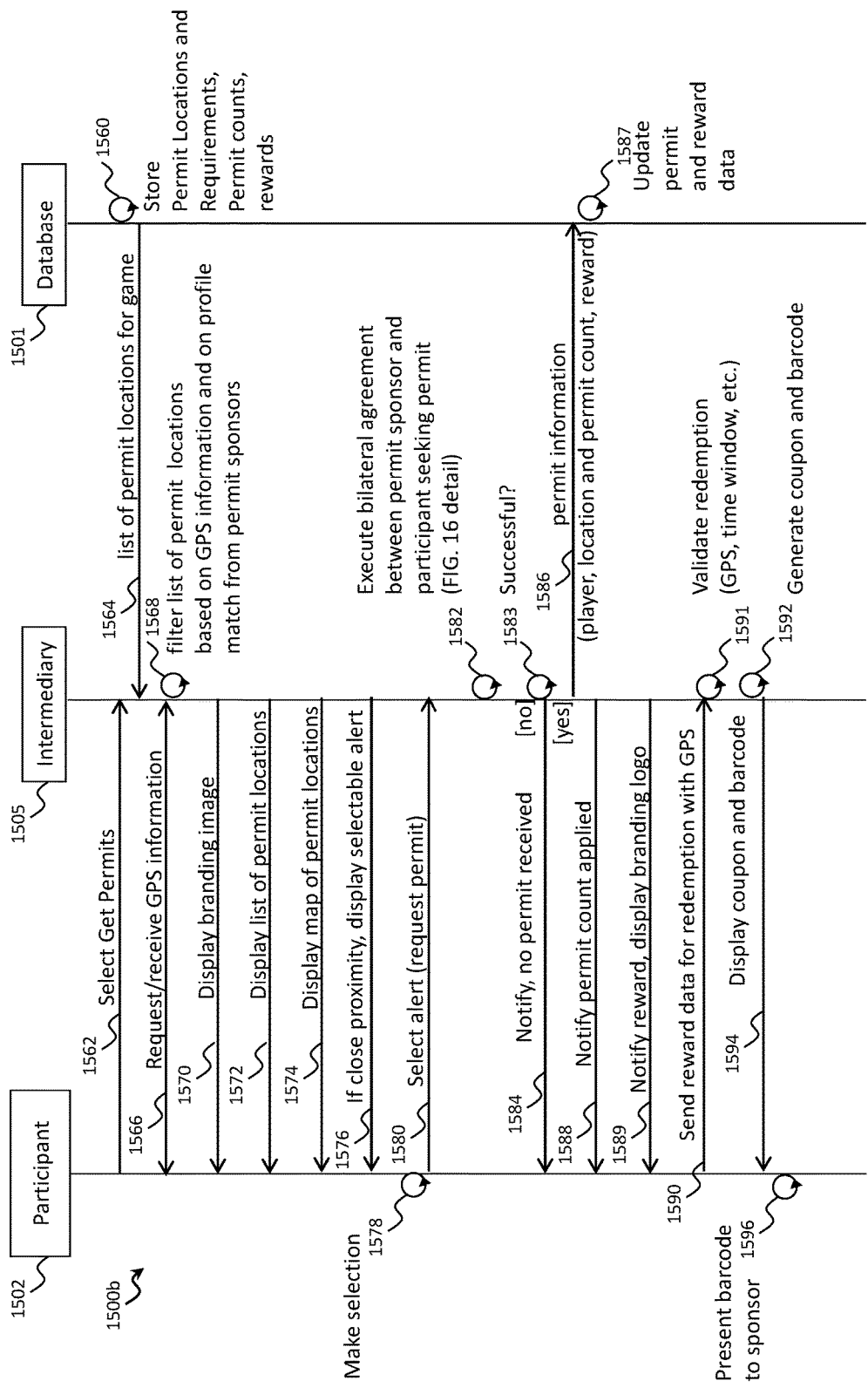
FIG. 15B is a sequence diagram of obtaining permits with a bilateral agreement requirement.

Referring to FIG. 15B, a sequence diagram is disclosed for a preferred embodiment method for obtaining permits including a bilateral agreement between a participant and a permit sponsor. In one embodiment, the permit sponsor and the game sponsor are the same. However, in an alternate embodiment, the permit sponsor may be different than a game sponsor for the game associated with a permit. The method 1500b involves intermediary 1505 having a database 1501 and interacting with a participant 1502. At step 1560, a set of permit locations, permit requirements, permit counts at each location, and rewards associated with each location are stored in the database. In other embodiments, the permit data of step 1560 can be dynamic and change with time, according to environmental variables, circumstantial variables or game variables.

At step 1562, the participant selects to "get permits" for a game. At step 1564, the intermediary retrieves a list of permit locations for the available game. At step 1566, the intermediary requests and receives GPS coordinate information from the participant. At step 1568, the intermediary filters the list of permit locations based on the GPS coordinate information, sorting the list in order of proximity to the participant. At step 1570, a branding image for a sponsor of the game is displayed for the participant. At step 1572, the list of permit locations is displayed adjacent the branding image and an option to view a map of the permit locations is provided. At step 1574, a map of the permit locations is displayed. In the preferred embodiment, the participant can switch between a map view and a list view of the permit locations.

At step 1576, for those permit locations that are in close proximity a selectable alert is displayed. "Close proximity" is defined as distance sufficient to validate the permit.

At step 1578, the selectable alert is selected to initiate a request for a permit. At step 1580, the request for a permit is received by intermediary 1505. At step 1582, a bilateral agreement process is performed between the participant seeking the permit and the permit sponsor. At step 1583, a determination is made as to the success or failure of the bilateral agreement process. At step 1584, if the bilateral agreement process was not successful, then intermediary 1505 notifies participant 1502 that no permit was received.

At step 1583, if the bilateral agreement process is successful, then a permit is granted and method 1500b continues.

At step 1586, a granted permit is transmitted to the database with permit data including the participant, the location, a permit count, an associated game, and a reward if available. At step 1587, permit data and reward data for the participant, the permit sponsor and the game is updated based on the granted permit.

At step 1588, a notification that the permit was granted along with an updated permit count is transmitted to the participant. If a reward is available, then at step 1589, a notification of the reward is transmitted to the participant and made available for redemption. In a preferred embodiment, redemption is immediately actionable at the permit location. A branding image for the permit sponsor is included with the permit and reward.

At step 1590, the participant selects to redeem the particular reward and reward data is sent to the intermediary along with the current GPS coordinates. At step 1591, the reward is validated by checking a set of conditions for the reward as set by the sponsor including a time and date window condition and a location condition. The participant's location is determined to match a location condition. The time and date is checked to be in a matching time and date window for validity. If validated, then at step 1592, the intermediary generates a coupon and a barcode. At step 1594, the coupon and barcode are displayed by the participant. At step 1596, the barcode is scanned to receive the reward, for example, a sponsor barcode scanner at a point of sale scans the barcode so the consumer can purchase an item using the coupon.

Figure 16:
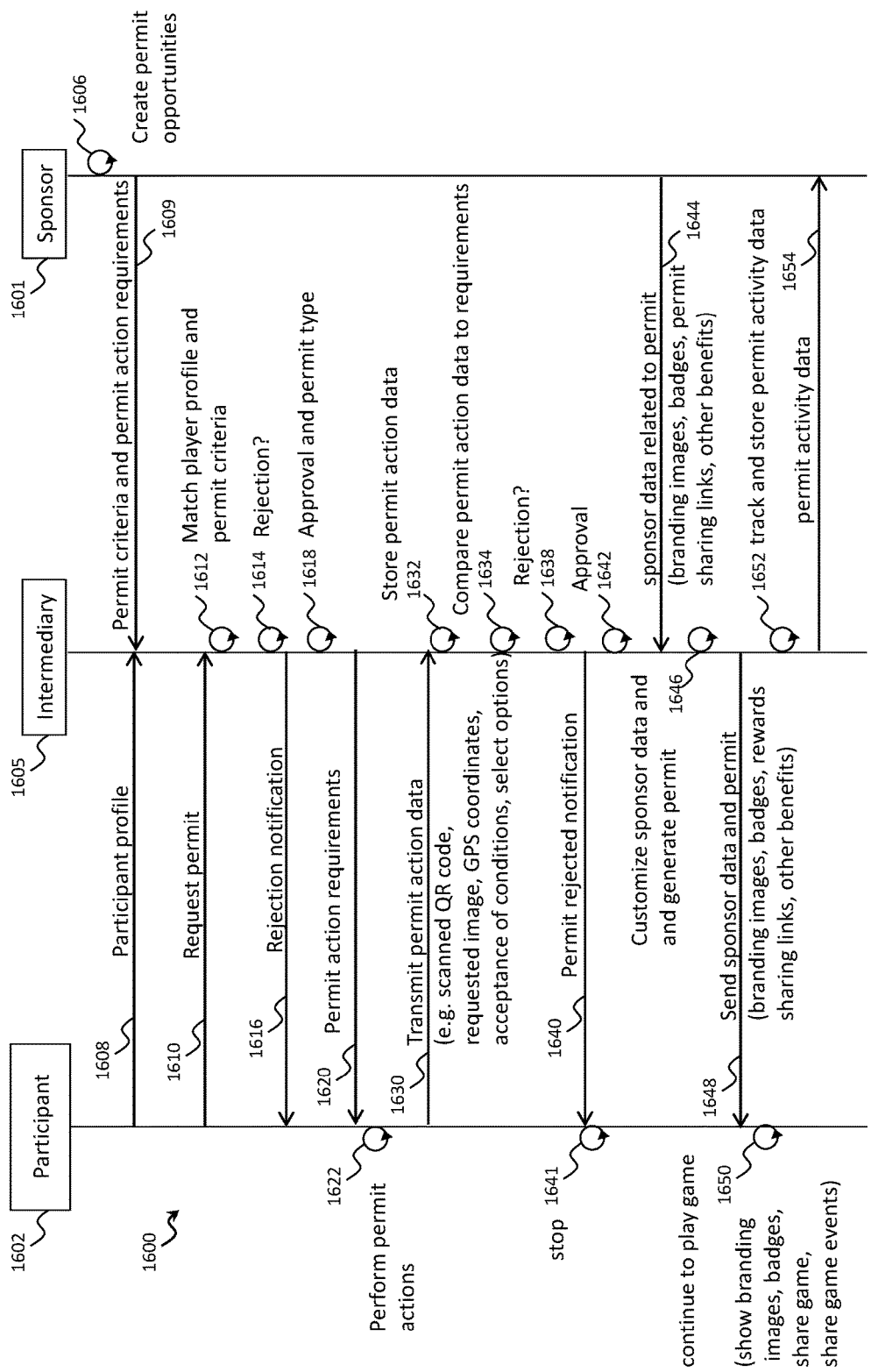
FIG. 16 is a sequence diagram of a bilateral agreement process for obtaining permits.

Referring to FIG. 16, a bilateral agreement process for obtaining permits for a game is disclosed. At step 1606, sponsor 1601 creates a set of permit opportunities with sponsor permit criteria and permit action requirements for participants. At step 1608, the intermediary receives a set of participant profiles including a participant profile for each participant, and according to step 1609, the intermediary receives the sponsor permit criteria and a set of permit action requirements including a permit requirement for each permit opportunity.

At step 1610, a request for a permit is received by intermediary 1605. At step 1612, intermediary 1605 compares the participant profile to the sponsor permit criteria to determine a match. At step 1614, if step 1612 does not yield a match, then step 1616 is performed where a rejection notification may be transmitted to participant 1602. At step 1617, upon a rejection notification, permit process 1600 stops.

At step 1618, if step 1612 yields a match, then the participant is approved for a permit having attributes customized based on the match. For example, a multiple permit type can be approved where a participant qualifies for a certain number of permits based on the match. In another example, a special permit type is approved with additional coupon benefits for the permit based on the match.

Step 1620 is performed where the set of permit action requirements is sent to participant 1602. A permit action requirement is an action of the participant deemed necessary by the sponsor to earn the permit. For example, a permit action requirement may include a location to visit, a confirmation of location by GPS, an object for which a picture is to be taken and sent, a website to interact with, an acceptance/agreement of a set of conditions or game options, a QR code to scan, questions to answer such as a survey, riddle or trivia question or combinations of several such actions and so forth.

At step 1622, the participant performs a permit action resulting in a permit action data. At step 1630, the permit action data is received by the intermediary where, at step 1632, the permit action data is stored by the intermediary. At step 1634, the permit action data is compared to the permit action requirements to determine if all required permit actions are approved. At step 1638, if the permit actions are not approved, then, at step 1640, a notification of a rejected permit is sent to the participant, including instructions for completing permit actions. At step 1641, upon a notification of a rejected permit, permit process 1600 stops.

In an alternate embodiment, after rejection at step 1640, the participant can repeat permit process 1600 to meet the permit action requirements and earn the permit.

At step 1642, if the permit actions are approved, then permit process 1600 continues with step 1644, where a set of sponsor data related to the permit is received. Sponsor data includes, for example, branding images, badges, questions to answer, shared links to game actions, points and other game benefits. At step 1646, the intermediary customizes the set of sponsor data and generates a permit for the participant. At step 1648, the set of sponsor data and the permit, customized by the intermediary, is transmitted to the participant.

At step 1650, the participant continues to play the game based on receiving the permit, showing the branding images, showing badges, sharing the shared links and game events related to the game and the permit.

At step 1652, the intermediary tracks and stores permit activity data for participant 1602 and sponsor 1601.

At step 1654, the permit activity data may be transmitted to sponsor 1601.

In an alternate embodiment, optional step 1654 is performed where permit activity data is transmitted to the sponsor of permits. In the alternate embodiment, the sponsor is provided a web portal to view all permit activity data and to select and view statistical information.

Figure 17:
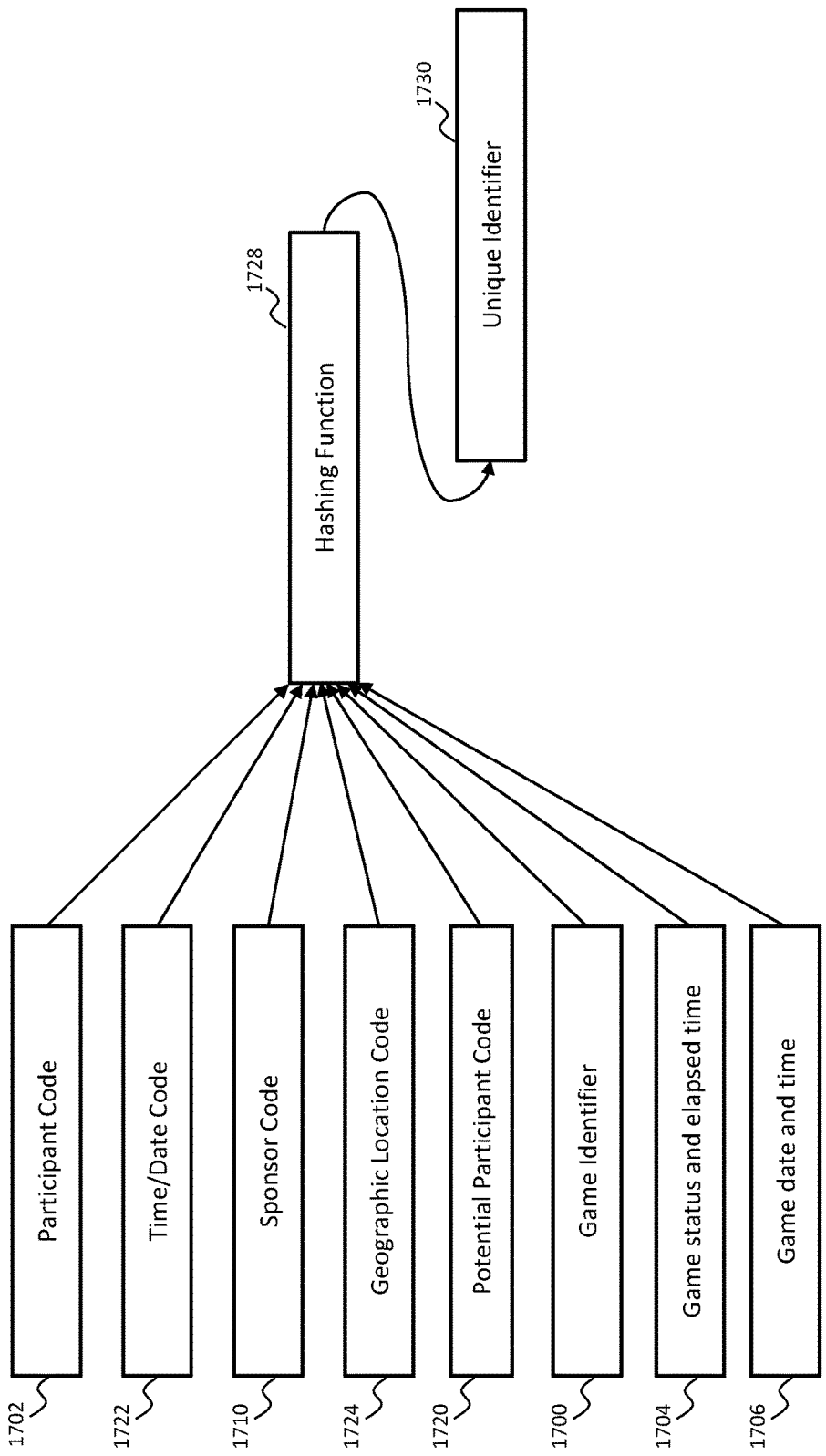
FIG. 17 is a diagram that illustrates creation of a unique identifier.

FIG. 17 is a diagram that illustrates the creation of a unique identifier according to one embodiment. Unique identifier 1730 is generated by hash function 1728 from one or more codes and information, such as game code 1700, participant code 1702, game status and elapsed time information 1704, game date and time information 1706, sponsor code 1710, potential participant code 1720, time and/or date code 1722, and geographic location code 1724. Unique identifier 1730 is used as or within a token that is sent from a participant to a potential participant, such as the tokens described in FIGS. 18A through 18C.

Game code 1700 identifies the game that a participant has selected to share with a potential participant. Participant code 1702 identifies the participant that has selected to share a game. Game status and elapsed time information 1704 is a string or array of information that identifies the status of a game and the elapsed time of the game via one or more status strings, including: "just started", "half done", "game complete", "5 hours 35 minutes remaining", "2 hours 28 minutes elapsed", and so on. Game date and time information 1706 is a string or array of information that identifies one or more of the start time, end time, start date, and end date of a game. Sponsor code 1710 identifies the sponsor of the game that is selected by the participant to be shared with the potential participant. Potential participant code 1720 identifies the potential participant that the participant is sharing the game with. Time and date code 1722 identifies the time and date of when a participant selected to share a game with another potential participant. Geographic location code 1724 identifies the geographic location of the participant when the participant selected to share a game hosted by the intermediary. In one embodiment, unique identifier 1730 is created for each token sent and each token comprises a hyperlink with the unique identifier as a part of the hyperlink, an example of which is shown below where the string of 32 hexadecimal digits represents a 128-bit unique identifier.

http://bca2.com/ad.aspx?uid=
2F01E17841B833A52E7781760D400009

The unique identifier 1730 is created by combining one or more separate codes and information together in any one of many encryption routines (known in the art as "hashing") to form a code that is unique for each endorsement sent by a subscriber. Participant code 1702 and potential participant code 1720 may be created based on device serial number, phone number or other numbers unique to a device. Other codes, including date code 1722 and geographic location code 1724 are combined with participant code 1702 and potential participant code 1720 to create unique identifier 1730.

In one embodiment, hashing function 1728 is the MD5 message-digest algorithm and is used to create unique identifier 1730 as a 128 bit number. Each code and information used as an input to hashing function 1728 to is stored as a string of bytes that are each concatenated prior to being provided to hashing function 1728. Hashing function 1728 performs the MD5 algorithm on the concatenated string of bytes to form unique identifier 1730 as a 128 bit number that is used as or with a token. In one embodiment, an intermediary stores the token in a database and associates the token with the codes and information used to generate the token. When the intermediary later receives the token in a message or request, the intermediary finds the information used to generate the token by searching for the token in the database. Examples of the intermediary and database include intermediary 105 and database 112 of FIG. 1.

Figure 18A:
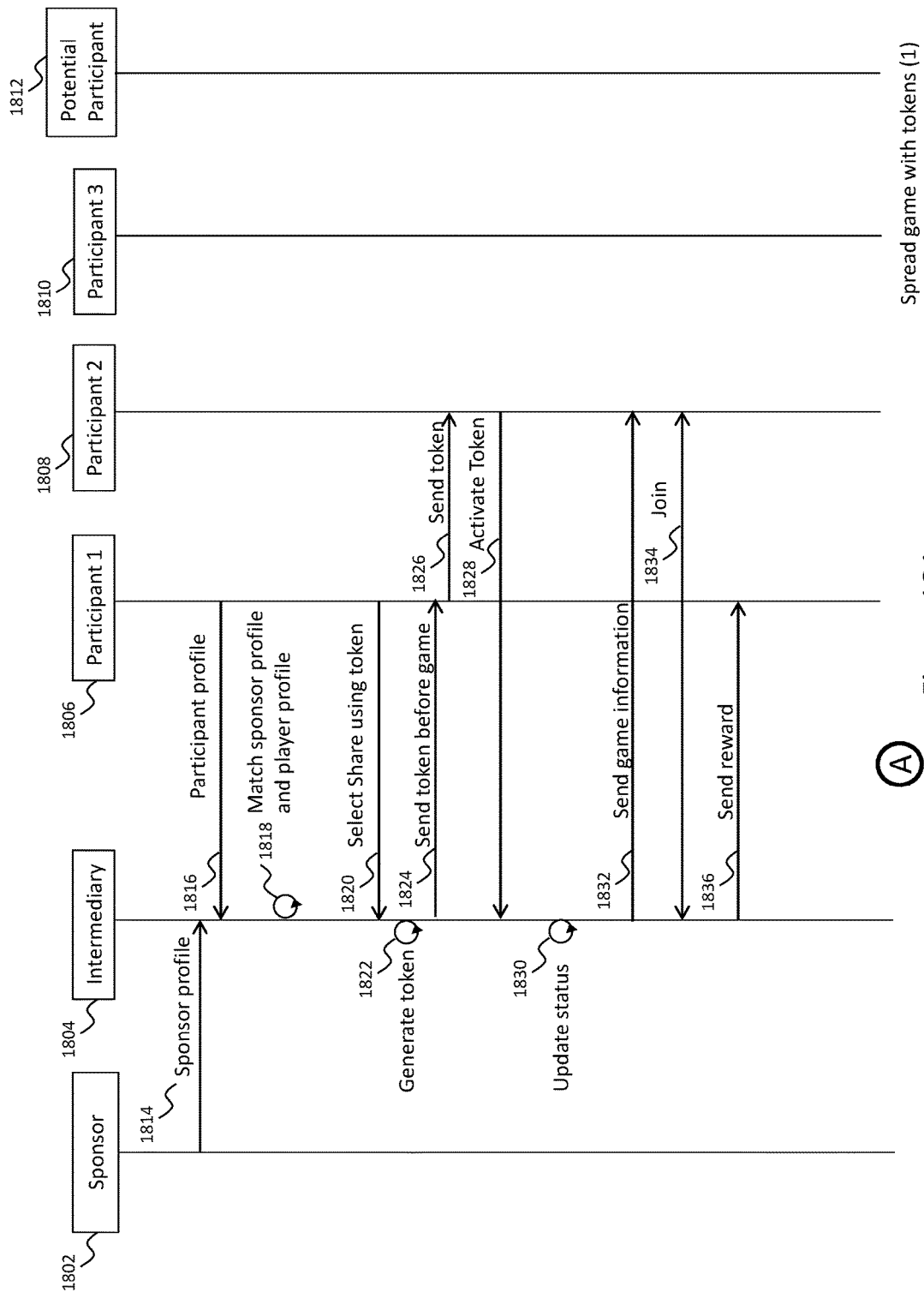
FIGS. 18A through 18C are a sequence diagram of sharing games using tokens.
Figure 18B:
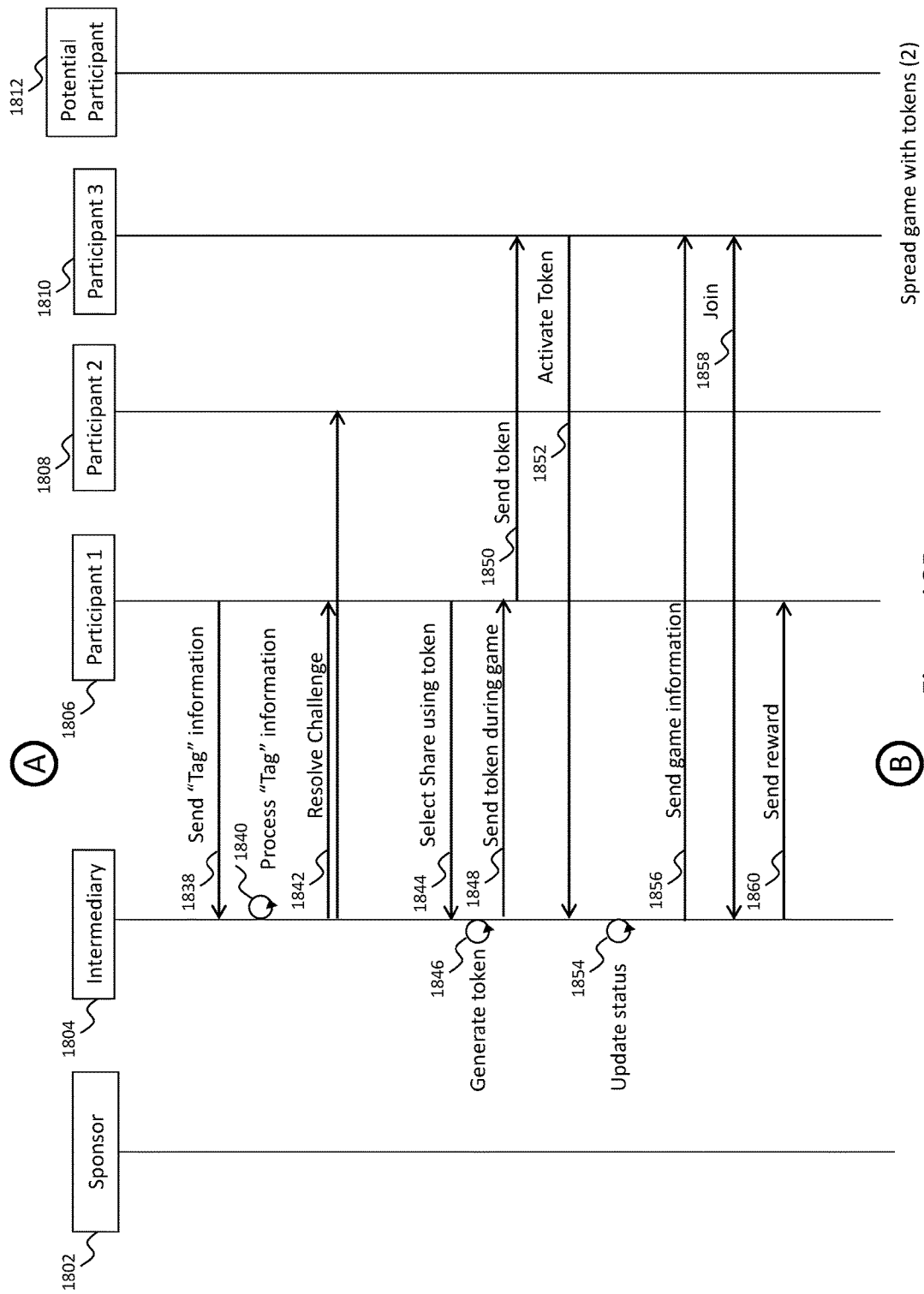
Figure 18C:
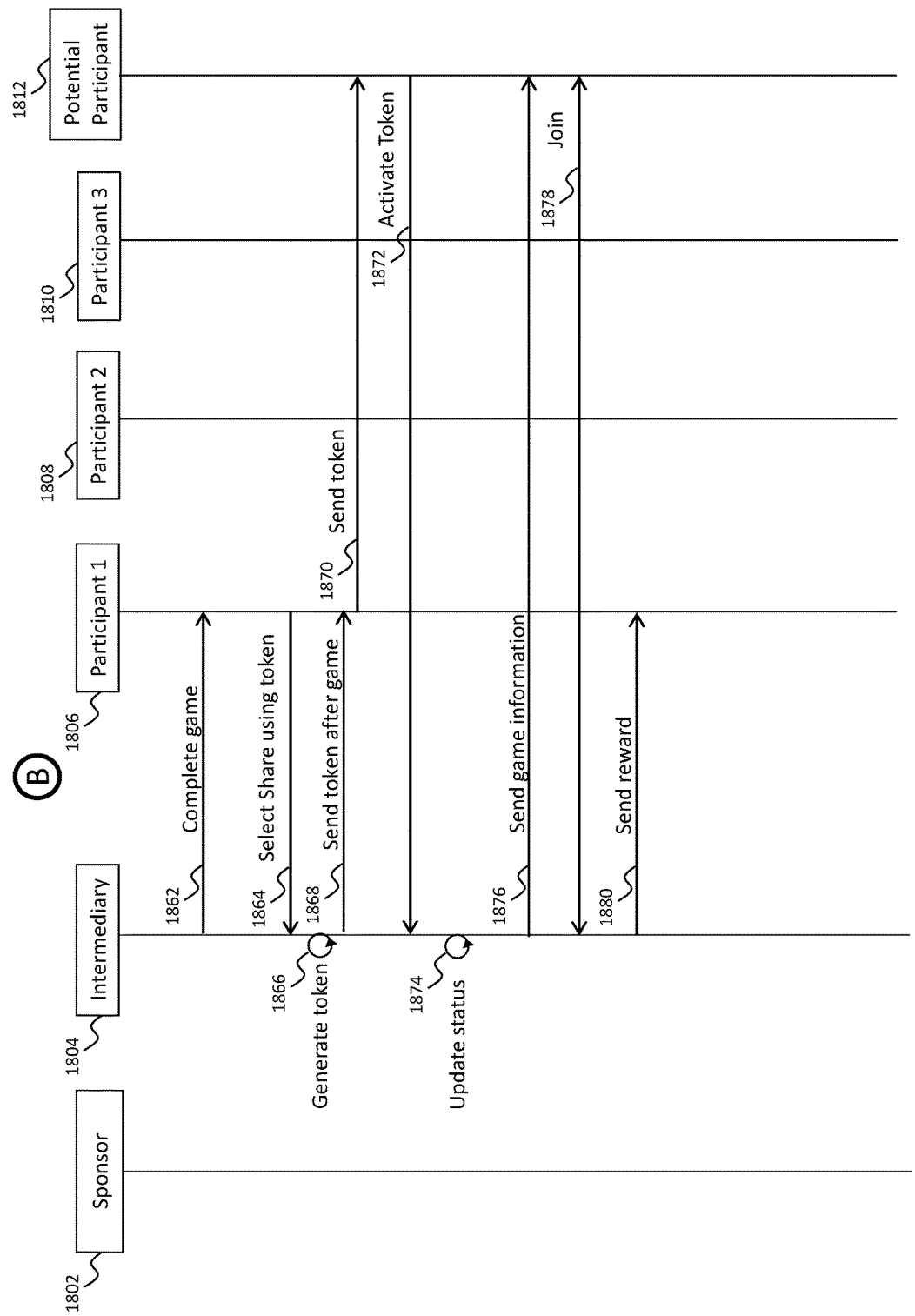

FIGS. 18A and 18B are a sequence diagram of a participant interacting with potential participants. The sequence diagram illustrates the messages passed between the devices sponsor 1802, intermediary 1804, first participant 1806, second participant 1808, third participant 1810, and potential participant 1812, wherein the types of devices include servers, hand held computers, tablets, desktop computers, cloud computing services, and so on.

Sponsor 1802 is a sponsor of a game that is hosted by intermediary 1804. Intermediary 1804 hosts the game sponsored by sponsor 1802 and played by one or more participants. First participant 1806 plays the game hosted by intermediary 1804 and sponsored by sponsor 1802 and invites second participant 1808, third participant 1810, and potential participant 1812 to interact with intermediary 1804. Second participant 1808 joins the game while it is pending after receiving a token from first participant 1806. Third participant 1810 joins the game while it is being played and after receiving a token from first participant 1806. Potential participant 1812 receives a token from first participant 1806 after the game is completed. First participant 1806, second participant 1808, and third participant 1810 may also be referred to as subscribers after setting up an account with intermediary 1804. Second participant 1808, third participant 1810, and potential participant 1812 may also be referred to as recipients, such as when receiving information from first participant 1806.

At step 1814, sponsor 1802 sends sponsor profile information to intermediary 1804, which is further described in the sequence diagram of FIG. 4. Sponsor profile information includes one or more of graphics, text, locations, rules, rewards, and so on, which are stored by intermediary 1804 in a database.

At step 1816, first participant 1806 sends participant profile information to intermediary 1804. The sequence diagram of FIG. 5 provides additional description of one implementation of step 1816. Participant profile information includes demographic data for the participant and general information required to match the participant to a game opportunity, permit opportunity or other benefit. In one embodiment, the demographic data of the participant profile information includes one or more numerical or categorical values that describe a participant's education, nationality, religion, ethnicity, marital status, residence location, work location, interests, and so on, which are voluntarily provided by the participant and are stored by intermediary 1804 in a database.

At step 1818, intermediary determines a match, also referred to as a bilateral agreement, between sponsor profile information and participant profile information. As a result of the match, a list of eligible games and other information is sent to first participant 1806. FIG. 7 provides additional description of this process.

Steps 1820 through 1836 occur prior to starting a game, such as during the pending game sequence described in FIG. 8.

At step 1820, first participant 1806 selects to share the pending a game using a token and first participant 1806 sends the selection to intermediary 1804. In one embodiment, the token comprises a uniform resource locator (URL) or hyperlink that includes a unique identifier, such as unique identifier 1730 of FIG. 17. In one embodiment, the token also includes the user id, handle, or screen name of first participant 1806 that first participant 1806 is using in one or more games hosted by intermediary 1804 to allow the recipient of the token to identify first participant 1806 in the games hosted by intermediary 1804. The selection can include an identification of second participant 1808, including among other things, name, geographic location, an email or other address, and biographic information.

At step 1822, intermediary 1804 generates a token based on one or more codes related to first participant 1806, the game that first participant 1806 has selected to share, second participant 1808, the time and/or date, a geographic location of either the game or first participant 1806, and sponsor 1802. The token forms part of a set of information that is related to the content of the game and that is selected based on the match from step 1818. The token may also include a link to intermediary 1804 and/or a link to sponsor 1802.

At step 1824, intermediary 1804 sends the token to first participant 1806. The token is sent via one or more of an email, an SMS message, an application message, and so on. When the token is sent via an application notification, the device of first participant 1806 shows a notification that indicates that the token has been received.

At step 1826, first participant 1806 sends the token to second participant 1808. When the token is sent via an SMS message or an email, the SMS message or email comprising the token is selected to be forwarded to second participant 1808 by first participant 1806 using the device of first participant 1806. The SMS message or email communication from first participant 1806 may include additional content related to the game, the venue, the goods and services available at the venue, or an optional link to additional content related to the game, venue, and/or goods and services. When the token was received via an application notification, first participant 1806 copies and pastes the token into a new email or SMS message that is sent to second participant 1808. Alternatively, the application is integrated with the email client or SMS messaging client on the device of first participant 1806 so that the application automatically forwards the token to second participant 1808 using one or more of the email client or SMS messaging client on the device of first participant 1806.

At step 1828, second participant 1808 activates the token received from first participant 1806. Second participant 1808 activates the token by selecting the token in the messaging application that received the token to interact with the communication with first participant 1806 in a defined manner. Selecting the token in the messaging application opens a web browser application to view the website associated with the token by sending a request to intermediary 1804 for the website associated with the token.

At step 1830, intermediary 1804 updates the status of the system. In one embodiment, intermediary 1804 stores a record of the activation of the token by second participant 1808 to a database.

At step 1832, intermediary 1804 sends game information that is related to the token to second participant 1808, so that second participant 1808 can join in the game associated with the token that second participant 1808 received from first participant 1806. The game information received by second participant 1808 allows second participant 1808 to participate in one or more games by signing in and logging in (as described in FIG. 5), interacting with pending games (as described in FIG. 8), joining a game (as described in FIGS. 10 and 11), participating in the game (as described in one or more of FIGS. 12-16), and interacting with completed games (as described in FIG. 9). In one embodiment, the game information that is sent by intermediary 1804 is in the form of a web page that displays the current participants, rules, and available rewards related to participating in the game and allows second participant 1808 to join the game via one or more interactive links.

At step 1834, second participant 1808 joins the game identified in the token that first participant 1806 sent to second participant 1808. An embodiment of the process for joining is further described in FIGS. 10 and 11.

At step 1836, intermediary 1804 sends a reward or reward notification to first participant 1806. In one embodiment, the reward includes extra points for the game identified in the token that first participant 1806 sent to second participant 1808 and based on whether second participant 1808 activates the token sent to second participant 1808 and based on whether second participant 1808 joins a game hosted by intermediary 1804. Additional or alternative rewards include a discount coupon, a free product, a free product trial, and so on that are redeemable by first participant 1806. The coupon may be related to the game, the venue for the game, goods and services available at the venue, or other content related to or provided by sponsor 1802.

Steps 1838 through 1860 occur while a game is in progress. Steps 1836 through 1840 describe a "tagging event" that is one embodiment of the tagging event described in FIG. 13.

At step 1838, first participant sends tag information to intermediary 1804. In one embodiment the tag information is a picture taken of one of second participant 1808 and third participant 1810. At this point third participant 1810 is a potential participant that has not yet joined the game. In an alternative embodiment, the tag information is a confirmation of an SMS message or email message that is sent to third participant 1810.

At step 1840, intermediary 1804 processes the tag information. In processing the tag information, intermediary 1804 determines a reward related to the tag information and determines whether to allow the tagging event related to the tag information to be challenged.

At step 1840, a challenge with the "tagging event" is resolved. Intermediary 1804 communicates with first participant 1806 and second participant 1808 to allow second participant to challenge the "tagging event", which is further described in FIG. 13.

Steps 1844 through 1860 describe the sequence of inviting third participant 1810 into a game while the game is in progress. Steps 1844 through 1860 occur during a game, such as during the sequence described in FIGS. 12 and 13.

At step 1844, first participant 1806 selects to share a game using a token and first participant 1806 sends the selection to intermediary 1804. In one embodiment, the token comprises a uniform resource locator (URL) or hyperlink that includes a unique identifier, such as unique identifier 1730 of FIG. 17.

At step 1846, intermediary 1804 generates a token based on one or more codes related to first participant 1806, the game that first participant 1806 has selected to share, third participant 1810, the time and/or date, a geographic location of either the game or first participant 1806, and sponsor 1802. The token forms part of a set of information that is related to the content of the game and that is selected based on the match from step 1818.

At step 1848, intermediary 1804 sends the token to first participant 1806. The token is sent via an application notification to the game that is active on the device of first participant 1806. The device of first participant 1806 shows a notification that indicates that the token has been received.

In an alternative embodiment, the token is sent via one or more of an email and an SMS message that is received by first participant 1806.

At step 1850, first participant 1806 sends the token to third participant 1810. The application running on the device of first participant 1806 is integrated with the email client or SMS messaging client on the device of first participant 1806 so that the application automatically forwards the token to third participant 1810 using one or more of the email client or SMS messaging client on the device of first participant 1806. In one embodiment, the application automatically copies the token to a clipboard application on the device of first participant 1806 so that that token can be pasted into an SMS message or email message by first participant 1806. In an alternative embodiment, when the token was received via an SMS message or an email from intermediary 1804, the SMS message or email comprising the token is selected to be forwarded to third participant 1810 by first participant 1806 using the device of first participant 1806.

At step 1852, third participant 1810 activates the token received from first participant 1806. Third participant 1810 activates the token by selecting the token in the messaging application that received the token to interact with the communication with first participant 1806 in a defined manner. Selecting the token in the messaging application opens a web browser application to view the website associated with the token by sending a request to intermediary 1804 for the website associated with the token.

At step 1854, intermediary 1804 updates the status of the system. In one embodiment, intermediary 1804 stores a record of the activation of the token by third participant 1810 to a database.

At step 1856, intermediary 1804 sends game information that is related to the token to third participant 1810, so that third participant 1810 can join in the game associated with the token that third participant 1810 received from first participant 1806. The game information received by third participant 1810 allows third participant 1810 to participate in one or more games by signing in and logging in (as described in FIG. 5), interacting with pending games (as described in FIG. 8), joining a game (as described in FIGS. 10 and 11), participating in the game (as described in one or more of FIGS. 12-16), and interacting with completed games (as described in FIG. 9). In one embodiment, the game information that is sent by intermediary 1804 is in the form of a web page that displays the current participants, rules, and available rewards related to participating in the game and allows third participant 1810 to join the game via one or more interactive links.

At step 1858, third participant 1810 joins the game identified in the token that first participant 1806 sent to third participant 1810. An embodiment of the process for joining is further described in FIGS. 10 and 11.

At step 1860, intermediary 1804 sends a reward or reward notification to first participant 1806. In one embodiment, the reward includes extra points for the game identified in the token that first participant 1806 sent to third participant 1810 and based on whether third participant 1810 activates the token sent to third participant 1810 and based on whether third participant 1810 joins a game hosted by intermediary 1804. Additional or alternative rewards include a discount coupon, a free product, a free product trial, and so on that are redeemable by first participant 1806.

At step 1862, the game is completed and intermediary sends a notification to first participant 1806 that the game has been completed. The application running on the device of first participant 1806 transitions from the game user interface to the completed game user interface.

Steps 1864 through 1880 describe the sequence of inviting potential participant 1812 into a game after a game has been completed. Steps 1864 through 1880 occur after a game has been completed, such as during the sequence described in FIG. 9.

At step 1864, first participant 1806 selects to share a game using a token and first participant 1806 sends the selection to intermediary 1804. In one embodiment, the token comprises a uniform resource locator (URL) or hyperlink that includes a unique identifier, such as unique identifier 1730 of FIG. 17.

At step 1866, intermediary 1804 generates a token based on one or more codes related to first participant 1806, the completed game that first participant 1806 has selected to share, potential participant 1812, the time and/or date, a geographic location of either the game or first participant 1806, and sponsor 1802. The token forms part of a set of information that is related to the content of the game and that is selected based on the match from step 1818.

At step 1868, intermediary 1804 sends the token to first participant 1806. The token is displayed as an application notification on the device of first participant 1806. The device of first participant 1806 shows a notification that indicates that the token has been received. In an alternative embodiment, the token is sent via one or more of an email and an SMS message that is received by first participant 1806.

At step 1870, first participant 1806 sends the token to potential participant 1812. The application running on the device of first participant 1806 is integrated with the email client or SMS messaging client on the device of first participant 1806 so that the application automatically forwards the token to potential participant 1812 using one or more of the email client or SMS messaging client on the device of first participant 1806. In one embodiment, the application automatically copies the token to a clipboard application on the device of first participant 1806 so that that token can be pasted into an SMS message or email message by first participant 1806. In an alternative embodiment, when the token was received via an SMS message or an email from intermediary 1804, the SMS message or email comprising the token is selected to be forwarded to potential participant 1812 by first participant 1806 using the device of first participant 1806.

At step 1872, potential participant 1812 activates the token received from first participant 1806. Potential participant 1812 activates the token by selecting the token in the messaging application that received the token to interact with the communication with first participant 1806 in a defined manner. Selecting the token in the messaging application opens a web browser application to view the website associated with the token by sending a request to intermediary 1804 for the website associated with the token.

At step 1874, intermediary 1804 updates the status of the system. In one embodiment, intermediary 1804 stores a record of the activation of the token by potential participant 1812 to a database.

At step 1876, intermediary 1804 sends game information that is related to the token to potential participant 1812, so that potential participant 1812 can join one or more games hosted by intermediary 1804. The game information received by potential participant 1812 allows potential participant 1812 to participate in one or more games by signing in and logging in (as described in FIG. 5), interacting with pending games (as described in FIG. 8), joining a game (as described in FIGS. 10 and 11), participating in a game (as described in one or more of FIGS. 12-16), and interacting with completed games (as described in FIG. 9). In one embodiment, the game information that is sent by intermediary 1804 is in the form of a web page that displays the current participants, rules, and available rewards related to participating in the game and allows potential participant 1812 to join a game via one or more interactive links.

At step 1878, potential participant 1812 joins a game based upon the token that first participant 1806 sent to potential participant 1812. An embodiment of the process for joining is further described in FIGS. 10 and 11.

At step 1880, intermediary 1804 sends a reward or reward notification to first participant 1806. In one embodiment, the reward includes extra points for the game identified in the token that first participant 1806 sent to potential participant 1812 and based on whether potential participant 1812 activates the token sent to potential participant 1812 and based on whether potential participant 1812 joins a game hosted by intermediary 1804. Additional or alternative rewards include a discount coupon, a free product, a free product trial, and so on that are redeemable by first participant 1806.

The embodiments presented in this disclosure are intended to provide implementable examples of the present invention, but are not intended to limit the present invention. The features and elements for any one embodiment described above can be shared, mixed, and matched with the features and elements of any other embodiment, including embodiments that are not explicitly described. For instance, the consumers may interact with their gaming information through a web interface on a non-portable computer; however, the physical gaming functions of "completing a tagging event" would obviously not be enabled. On the other hand, a consumer may interact with multiple games at one time through their special interface, simultaneously obtaining all of the information and functionality for each and every game as described herein. Furthermore, it should be understood that the intermediary can be hidden, in the sense that the participants need not be aware that data is flowing to and from the intermediary, particularly while authenticating. The nature of the rewards, coupons, game rules, completing a tagging event, permit requirements, permit actions, number of sponsors involved in a game and number of participants involved in a game, among other such details presented in the example embodiments and disclosed here, is not limited by this disclosure.

The invention claimed is:

1. A system for providing access to content from a sponsor to a first participant device, associated with a first participant, and providing the access to the content from the first participant device to a second participant device, associated with a second participant, comprising:
   a server, programmed to act as an intermediary and to store and execute instructions that cause the system to perform operations comprising:
   receiving at the server, a first set of information that describes one or more attributes related to the one or more first participants;
   receiving at the server, a second set of information that describes one or more attributes for targeting the content to the first participant;
   establishing an agreement between the first participant and the sponsor to access the content;
   sending, from the server to the first participant device, a third set of information, relating to the set of content, selected on the basis of a match between the first set of information and the second set of information, the third set of information including a component for inclusion in a communication to the second participant device; and, providing the content to the second participant device.

2. The system of claim 1 wherein the operations further comprise:

receiving, at the server, an indication that the second participant device has interacted with the communication in a defined manner; and, providing the content to the second participant device in response to receiving the indication.

3. The system of claim 2 wherein the operations further comprise:

incentivizing the first participant to communicate the component to the second participant device.

4. The system of claim 3 wherein the incentivizing is conditioned on the second participant device interacting with the component in a defined manner.

5. The system of claim 3 wherein the incentivizing is a coupon program related to the set of content.

6. The system of claim 1 wherein the first set of information includes a geographic location.

7. The system of claim 1 wherein the component includes a link to the server.

8. The system of claim 1 wherein the component includes a link to the sponsor.

9. The system of claim 1 wherein the communication includes a fourth set of information related to the content and the component is a link to a fifth set of information related to the content.

10. The system of claim 1 wherein the operations further comprise:

receiving, at the server, a selection, related to the content, from the first participant device; and, in response to the selection, providing the fourth set of information to the first participant device.

11. The system of claim 1 wherein the operations further comprise:

receiving, at the server, from the first participant device, an identification of the second participant device that the first participant has identified for sharing the third set of information.

12. A system, comprising:

one or more first participant devices;

one or more second participant devices; and, a server programmed to act as an intermediary between the one or more first participant devices and one or more sponsors, and to store and execute instructions that cause the system to perform operations comprising:

storing, at the server, a first set of information related to one or more first participants, the first set of information including a first set of geographic attributes related to the one or more first participants;

storing, at the server, a second set of information related to a target participant of the one or more sponsors, the second set of information including a second set of geographic attributes;

finding, at the server, a set of matches between the first set of geographic attributes and the second set of geographic attributes;

causing the server to respond to the set of matches by providing a set of content to a matched first participant device of the one or more first participant devices;

causing the server to respond to a receipt of a set of selections from the matched first participant device of the one or more first participant devices by providing to the first participant device of the one or more first participant devices a link adapted to be forwarded to the one or more second participant devices, and;

causing the server to respond to a receipt of a signal related to a click on the link by providing to the one or more second participant devices a third set of information related to the set of content.

13. The system of claim 12 wherein the link is related to the set of content.

14. The system of claim 12 wherein the link is related to allowing participation in the system.

15. The system of claim 12 wherein the operations further comprise:

rewarding a first participant of the one or more first participants for forwarding the link to one or more second participants that participate in the system.

16. The system of claim 15 wherein the participation includes one or more of joining a game and performing a tagging event in a game.

17. The system of claim 13 wherein the operations further comprise:

encouraging a first participant of the one or more first participants to transmit the link to the one or more second participant devices.

18. The system of claim 17 wherein the operation of encouraging further comprises:

providing a coupon conditioned on receiving an indication that a second participant device of the set of second participant devices receives a click on the link related to the set of content.

* * * * *